(12) United States Patent
Zhang et al.

(10) Patent No.: US 11,981,258 B2
(45) Date of Patent: May 14, 2024

(54) COMPONENT FOR VEHICLE INTERIOR

(71) Applicant: Shanghai Yanfeng Jinqiao Automotive Trim Systems Co. Ltd., Novi, MI (US)

(72) Inventors: Jixiang Zhang, Shanghai (CN); Jing Gu, Shanghai (CN)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 18/310,893

(22) Filed: May 2, 2023

(65) Prior Publication Data

US 2023/0271549 A1 Aug. 31, 2023

Related U.S. Application Data

(63) Continuation-in-part of application No. PCT/CN2021/126367, filed on Oct. 26, 2021.

(30) Foreign Application Priority Data

Nov. 3, 2020 (CN) .......................... 202011208830.5

(51) Int. Cl.
*B60Q 3/60* (2017.01)
*B60Q 3/54* (2017.01)
(52) U.S. Cl.
CPC ................. *B60Q 3/60* (2017.02); *B60Q 3/54* (2017.02)
(58) Field of Classification Search
CPC .................................... B60Q 3/60; B60Q 3/54
See application file for complete search history.

(56) References Cited

U.S. PATENT DOCUMENTS 6,805,468 B2 * 10/2004 Itoh ........................... F21V 5/02
362/558
9,952,376 B2 4/2018 Kim et al.
(Continued)

FOREIGN PATENT DOCUMENTS

CN 102798081 A 11/2012
CN 104748072 A 7/2015
(Continued)

OTHER PUBLICATIONS

International Search Report and Written Opinion for International Application No. PCT/CN2021/126367 dated Jan. 20, 2022.
(Continued)

*Primary Examiner* — Bryon T Gyllstrom
(74) *Attorney, Agent, or Firm* — Amin, Turocy & Watson, LLP

(57) ABSTRACT

A component for a vehicle interior may comprise a display system comprising a light source and a composite structure comprising a base layer, an intermediate layer and a cover layer. The base layer may comprise a surface comprising a set of elements. The composite structure may present a composite visual effect contributed by the composite structure and/or a visual effect contributed by light from the light source. The visual effect contributed by the composite structure may comprise a visual effect without light from the light source and/or a visual effect with light from the light source transmitted through the composite structure. The composite visual effect of the display system may comprise a visual effect of the form/elements of the base layer and/or the form/visual object/pattern of the intermediate layer and/or the form/visual object/pattern of the cover layer.

21 Claims, 12 Drawing Sheets

(56) References Cited

U.S. PATENT DOCUMENTS

| | | | |
|---|---|---|---|
| 10,144,347 B1 | 12/2018 | Schneider et al. | |
| 10,501,013 B2 | 12/2019 | Wimmer et al. | |
| 10,967,786 B1* | 4/2021 | Richardson | B32B 5/024 |
| 2008/0143132 A1* | 6/2008 | Okuda | B60R 13/02 296/1.08 |
| 2017/0075125 A1* | 3/2017 | Lee | G02B 30/27 |
| 2017/0349095 A1* | 12/2017 | Wimmer | B60Q 3/54 |
| 2019/0126853 A1* | 5/2019 | Cannon | H05B 3/86 |
| 2019/0389412 A1 | 12/2019 | Walters et al. | |
| 2020/0055429 A1* | 2/2020 | Drbohlav | B60N 2/58 |
| 2020/0346486 A1* | 11/2020 | Ochiai | G02B 3/005 |
| 2021/0170944 A1* | 6/2021 | Lee | G02B 6/0036 |
| 2022/0065422 A1* | 3/2022 | Caruso | B44F 9/10 |
| 2022/0097628 A1* | 3/2022 | Yu | B60Q 3/54 |
| 2022/0111731 A1* | 4/2022 | Zhao | G06F 3/0446 |
| 2022/0340078 A1* | 10/2022 | Imaoka | G09F 21/049 |

FOREIGN PATENT DOCUMENTS

| | | |
|---|---|---|
| CN | 106515608 A | 3/2017 |
| CN | 107002975 A | 8/2017 |
| CN | 107176113 A | 9/2017 |
| CN | 108413295 A | 8/2018 |
| CN | 110160008 A | 8/2019 |
| CN | 209782325 U | 12/2019 |
| CN | 111290211 A | 6/2020 |
| CN | 111347730 A | 6/2020 |
| CN | 111376843 A | 7/2020 |
| CN | 211731204 U | 10/2020 |
| CN | 112298027 A | 2/2021 |
| DE | 102015214619 A1 | 2/2017 |
| DE | 102015214620 A1 | 2/2017 |
| DE | 102016113635 A1 | 1/2018 |
| DE | 102018219853 A1 | 5/2020 |
| JP | 2019043280 A | 3/2019 |
| JP | 2019121511 A | 7/2019 |

OTHER PUBLICATIONS

Office Action and Search Report for Chinese Application No. 202011208830.5.

Notification to Grant Patent Right for Invention for Chinese Application No. 202011208830.5.

* cited by examiner

COMPONENT FOR VEHICLE INTERIOR

CROSS-REFERENCE TO RELATED APPLICATIONS

The present application is a continuation-in-part of PCT/International Patent Application No. PCT/CN2021/126367 filed Oct. 26, 2021, which claims the benefit of Chinese Patent Application No. 202011208830.5 (now Chinese Patent No. 112298027B) filed Nov. 3, 2020.

The present application claims priority to and incorporates by reference in full the following patent applications: (a) Chinese Patent Application No. 202011208830.5 (now Chinese Patent No. 112298027B) filed Nov. 3, 2020; (b) PCT/International Patent Application No. PCT/CN2021/126367 filed Oct. 26, 2021.

FIELD

The present invention relates to a component for a vehicle interior.

The present invention also relates to a component for a vehicle interior comprising a component comprising a display system configured to present a composite visual effect.

BACKGROUND

It is known to provide a component for a vehicle interior configured to present a visual effect such as an illuminated surface or image.

It would be advantageous to provide an improved component for a vehicle interior configured to present a visual effect such as a composite visual effect produced by a composite structure comprising a base layer and an intermediate layer.

It would be advantageous to provide an improved component for a vehicle interior configured to present a visual effect such as a composite visual effect produced by a composite structure comprising a base layer providing a surface with elements and an intermediate layer providing a pattern.

It would be advantageous to provide an improved component for a vehicle interior configured to present a visual effect such as a composite visual effect produced by a composite structure comprising a base layer providing a surface with elements and an intermediate layer providing a pattern and with light transmitted into the composite structure from a light source.

It would be advantageous to provide an improved component for a vehicle interior configured to present a visual effect such as a composite visual effect produced by a composite structure comprising a base layer providing a surface with elements and an intermediate layer providing a pattern and with light transmitted into the composite structure from a light source such that the composite visual effect comprises a variety of enhanced visual/lighting effects for the vehicle interior.

It would be advantageous to provide an improved component for a vehicle interior configured to present a visual effect such as a composite visual effect produced by a composite structure comprising a base layer providing a surface with prismatic elements and an intermediate layer providing a pattern and with light transmitted into the composite structure from a light source such that the composite visual effect comprises a variety of enhanced visual/lighting effects for the vehicle interior.

It would be advantageous to provide an improved component for a vehicle interior comprising a display system configured to present a visual effect such as a composite visual effect produced by a composite structure comprising a base layer providing a surface with prismatic elements and an intermediate layer providing a pattern and a cover layer with light transmitted into the composite structure from a light source such that the composite visual effect comprises a variety of enhanced visual/lighting effects including dynamic effects for the vehicle interior.

SUMMARY

The present invention relates to a component for a vehicle interior comprising a light source configured to provide light; and a composite structure comprising a base layer and an intermediate layer and a cover layer. The light source may be configured to transmit light into the composite structure. The base layer may comprise a surface comprising a set of elements. The composite structure may be configured to present a composite visual effect at the cover layer. The composite visual effect may comprise (a) a visual effect contributed by the composite structure and/or (b) a visual effect contributed by light from the light source. The visual effect contributed by the composite structure may comprise (a) a visual effect without light from the light source and/or (b) a visual effect with light from the light source transmitted through the composite structure. The light source may be configured to provide a lighting effect visible at the cover layer; the lighting effect may comprise light visible at the cover layer and/or variation in a form of light transmission and/or variation of light across the composite structure and/or variation of color of light across the composite structure and/or variation of intensity of light across the composite structure and/or variation of pattern of light across the composite structure; and/or motion of light across the composite structure and/or flowing of light across the composite structure and/or sequencing of light across the composite structure and/or intermittence of light across the composite structure. The lighting effect may comprise at least one of intensity and/or color and/or pattern and/or imagery and/or variation of intensity and/or variation of color and/or variation of pattern and/or variation of imagery. The light source may be configured to transmit light in a form configured to provide a dynamic visual effect; the form may comprise at least one of color and/or amplitude and/or intensity and/or frequency and/or segmentation and/or sequence and/or pattern and or imagery; the form may comprise a lighting effect. The component may comprise a diffuser layer (a) between the light source and the base layer and/or (b) between the base layer and the intermediate layer. The set of elements of the surface of the base layer may be configured to provide dispersion of light transmitted from the light source; the base layer may be configured to transmit light from the light source into the intermediate layer. The base layer may comprise a lens layer and/or a prismatic surface. The set of elements of the surface of the base layer may comprise a set of projections comprising at least one of (a) polygonal structures and/or (b) triangular structures and/or (c) quadrangular structures and/or (d) a combination of polygonal structures. The set of elements of the surface of the base layer may comprise a set of prismatic structures comprising at least one of (a) polygonal prismatic structures and/or (b) triangular prismatic structures and/or (c) quadrangular prismatic structures and/or (d) structures forming an uneven regular surface and/or (e) structures forming an irregular surface and/or (f) structures forming a prismatic surface and/or (g) structures configured to converge light from the light source and/or (h) structures configured to diverge light from the light source and/or (i) structures configured to disperse light from the light source. The base layer may be configured to provide a visual effect comprising a light dispersion effect; the light dispersion effect may comprise reflection and/or refraction of light. The base layer may be configured to provide a visual effect comprising a prismatic effect; the prismatic effect may be provided by the set of elements of the surface of the base layer. The intermediate layer may be configured to transmit light from the base layer; the intermediate layer may comprise a light-transmissive material; the intermediate layer may be configured to provide projection of light transmitted from the base layer; the intermediate layer may be configured to transmit light from the base layer into the cover layer. The intermediate layer may be configured to provide an imaging layer; the imaging layer may be configured to present a projection of light; the imaging layer may comprise a coating and/or a film; the imaging layer may comprise at least one of a color and/or a pattern and/or a texture and/or imagery. The intermediate layer may comprise a decorative layer; the decorative layer may be visible through the cover layer; the decorative layer may be configured to provide a visual effect comprising at least one of (a) a projection effect (b) a decorative effect and/or (c) a color effect and/or (d) a pattern effect and/or (e) a light dispersion effect and/or (f) a light dispersion effect from the base layer and/or (g) a prismatic effect from the base layer and/or (h) a lighting effect from the light source and/or (i) a lighting effect from transmission of light from the light source through the base layer. The cover layer may comprise a surface for the composite structure; the cover layer may comprise a light-transmissive material; the cover layer may comprise at least one of a color and/or a pattern and/or texture and/or a shape and/or a thickness. The composite visual effect may comprise a combined visual effect of (a) a light dispersion effect and/or (b) a prismatic effect from the base layer and/or (c) a projection effect from the intermediate layer and/or (d) a decorative effect from the intermediate layer and/or (e) a color effect from the intermediate layer and/or (f) a pattern effect from the intermediate layer and/or (g) a surface effect from the cover layer and/or (h) a depth effect from the cover layer and/or (i) a color effect from the cover layer and/or (j) a pattern effect from the cover layer and/or (k) a lighting effect from the light source and/or (l) a lighting effect from transmission of light from the light source through the base layer and/or (m) a lighting effect from transmission of light from the light source through the base layer and from the intermediate layer and/or (n) a day effect and/or (o) a night effect and/or (p) a stereoscopic effect and/or (q) a deadfront effect and/or (r) static visual effect from the light source and/or (s) dynamic visual effect from the light source and/or (t) and on/off backlit effect to illuminate and/or substantially conceal the interior of/pattern within the composite structure and/or (u) a variation of the viewing angle for a pattern/image within the composite structure and/or (v) a reflection at the surface of the cover layer of the composite structure.

The present invention relates to a component for a vehicle interior comprising a light-emitting unit; a lens layer comprising an incident surface and/or an emergent surface configured as a curved surface and/or a prismatic surface; an imaging layer configured to receive light emitted by the light-emitting unit and projected on the imaging layer through the lens layer to form a projection; and a cover layer. The projection on the imaging layer may be rendered visible through the cover layer. The lens layer may comprise the prismatic surface comprising prismatic elements at an acute angle; the prismatic elements may be configured with an R value between 0.01-0.09 mm. The light-emitting unit may be configured to provide a dynamic effect comprising a segmented light effect and/or an active light effect and/or an intermittent light-dark effect. The cover layer and/or the imaging layer may be configured to provide at least one of a pattern and/or a texture and/or a color.

The present invention relates to a component for a vehicle interior comprising a light source configured to provide light; and a composite structure comprising a base layer and an intermediate layer and a cover layer. The light source may be configured to transmit light into the composite structure. The base layer may comprise a surface comprising a set of elements. The composite structure may be configured to present a composite visual effect at the cover layer. The composite visual effect may comprise (a) a visual effect contributed by the composite structure and/or (b) a visual effect contributed by light from the light source. The visual effect contributed by the composite structure may comprise (a) a visual effect without light from the light source and/or (b) a visual effect with light from the light source transmitted through the composite structure. The light source may be configured to provide a lighting effect visible at the cover layer; the lighting effect may comprise light visible at the cover layer and/or variation in a form of light transmission and/or variation of light across the composite structure and/or variation of color of light across the composite structure and/or variation of intensity of light across the composite structure and/or variation of pattern of light across the composite structure; and/or motion of light across the composite structure and/or flowing of light across the composite structure and/or sequencing of light across the composite structure and/or intermittence of light across the composite structure. The lighting effect may comprise at least one of intensity and/or color and/or pattern and/or imagery and/or variation of intensity and/or variation of color and/or variation of pattern and/or variation of imagery. The light source may comprise at least one of (a) an LED; (b) an LED array; (c) a set of LEDs; (d) a light display; (e) a side light. The light source may be configured to transmit light in a form configured to provide the dynamic visual effect; the form may comprise at least one of color and/or amplitude and/or intensity and/or frequency and/or segmentation and/or sequence and/or pattern and or imagery; the form may comprise a lighting effect. The component may comprise a diffuser layer (a) between the light source and the base layer and/or (b) between the base layer and the intermediate layer. The base layer may be configured to transmit light from the light source; the base layer may comprise a light-transmissive material; the base layer may be configured to provide dispersion of light transmitted from the light source. The set of elements of the surface of the base layer may be configured to provide dispersion of light transmitted from the light source; the base layer may be configured to transmit light from the light source into the intermediate layer. The base layer may comprise a lens layer and/or a prismatic surface. The set of projections may comprise at least one of a set of prismatic structures; the set of prismatic structures may comprise at least one of (a) polygonal structures and/or (b) triangular structures and/or (c) quadrangular prismatic structures; the set of prismatic structures may comprise at least one of (a) structures forming an uneven regular surface and/or (b) structures forming an irregular prismatic surface and/or (c) structures configured to converge light from the light source and/or (d) structures configured to diverge light from the light source and/or (e)

structures configured to disperse light from the light source. The set of elements of the surface of the base layer may comprise a set of prismatic elements and/or a variation of the set of prismatic elements. The base layer may be configured to provide a visual effect comprising a light dispersion effect; the light dispersion effect may comprise reflection and/or refraction of light. The base layer may be configured to provide a visual effect comprising a prismatic effect; the prismatic effect may be provided by the set of elements of the surface of the base layer. The intermediate layer may be configured to transmit light from the base layer; the intermediate layer may comprise a light-transmissive material; the intermediate layer may be configured to provide projection of light transmitted from the base layer; the intermediate layer may be configured to transmit light from the base layer into the cover layer. The intermediate layer may be configured to provide an imaging layer; the imaging layer may be configured to present a projection of light; the imaging layer may comprise a coating and/or a film; the imaging layer may comprise at least one of a color and/or a pattern and/or a texture and/or imagery. The intermediate layer may comprise a decorative layer; the decorative layer may be visible through the cover layer. The intermediate layer may be configured to provide a visual effect comprising at least one of (a) a projection effect (b) a decorative effect and/or (c) a color effect and/or (d) a pattern effect and/or (e) a light dispersion effect from the base layer and/or (f) a prismatic effect from the base layer and/or (g) a lighting effect from the light source and/or (h) a lighting effect from transmission of light from the light source through the base layer. A lighting effect from transmission of light from the light source through the base layer may comprise projection of light within the intermediate layer to produce the projection effect; the projection effect may comprise a two-dimensional effect and/or three-dimensional effect. The cover layer may comprise a surface for the composite structure; the cover layer may comprise a light-transmissive material; the cover layer may comprise at least one of a color and/or a pattern and/or texture and/or a shape and/or a thickness. The cover layer may be configured to provide a visual effect; the visual effect may comprise a surface effect; the surface effect may comprise at least one of (a) a decorative effect and/or (b) reflection of light and/or (c) transmission of light and/or (d) transparency and/or (e) semi-transparency and/or (f) gloss and/or (g) light from the light source and/or (h) a vanish effect for the base layer and/or (i) an element configured to present a visual effect. The cover layer may comprise at least one of a color and/or a pattern and/or imagery. The surface effect may comprise at least one of reflection of ambient light within the vehicle interior. The cover layer may comprise a coating. The cover layer may be configured to provide a visual effect comprising at least one of (a) a surface effect; (b) a depth effect and/or (c) a color effect and/or (d) a pattern effect and/or (e) a light dispersion effect from the base layer and/or (f) a prismatic effect from the base layer and/or (g) a projection effect from the intermediate layer and/or (h) a decorative effect from the intermediate layer and/or (i) a color effect from the intermediate layer and/or (j) a pattern effect from the intermediate layer and/or (k) a lighting effect from the light source and/or (l) a lighting effect from transmission of light from the light source through the base layer and/or (m) a lighting effect from transmission of light from the light source through the base layer and from the intermediate layer. The composite visual effect may comprise a combined visual effect of (a) a light dispersion effect from the base layer and/or (b) a prismatic effect from the base layer and/or (c) a projection effect from the intermediate layer and/or (d) a decorative effect from the intermediate layer and/or (e) a color effect from the intermediate layer and/or (f) a pattern effect from the intermediate layer and/or (g) a surface effect from the cover layer and/or (h) a depth effect from the cover layer and/or (i) a color effect from the cover layer and/or (j) a pattern effect from the cover layer and/or (k) a lighting effect from the light source and/or (l) a lighting effect from transmission of light from the light source through the base layer and/or (m) a lighting effect from transmission of light from the light source through the base layer and from the intermediate layer and/or (n) a day effect and/or (o) a night effect and/or (p) a stereoscopic effect. The base layer comprising the surface may comprise a lens layer comprising a prismatic surface; the prismatic surface of the lens layer may comprise the set of elements of the surface of the base layer projecting at an acute angle. The intermediate layer may comprise at least one of materials of polycarbonate, acrylic, acrylonitrile-butadiene-styrene, nylon, polypropylene, polyurethane, metal, printing ink, wood, and fabric. The cover layer may comprise at least one of materials of polycarbonate, acrylic, acrylonitrile-butadiene-styrene, nylon, polypropylene, polyurethane, metal, printing ink, wood, fabric, epoxy resin, and UV paint. The intermediate layer and the cover layer may be (a) separated by a gap and/or (b) bonded by an optical adhesive.

The present invention relates to a component for a vehicle interior comprising a light-emitting unit; a lens layer comprising an incident surface and/or an emergent surface configured as a curved surface and/or a prismatic surface; an imaging layer configured to receive light emitted by the light-emitting unit and projected on the imaging layer through the lens layer to form a projection; and a cover layer. The projection on the imaging layer may be rendered visible through the cover layer. The imaging layer may comprise a translucent material; the translucent material may be configured so that the lens layer is not visible. The imaging layer may comprise a surface configured to enable the projection on the imaging layer to present a multi-dimensional effect. The lens layer may comprise the prismatic surface comprising prismatic elements at an acute angle; the prismatic elements may be configured with an R value between 0.01-0.09 mm. The light-emitting unit may be configured to provide at least one dynamic effect comprising a segmented light effect and/or an active light effect and/or and an intermittent light-dark effect. The cover layer and/or the imaging layer may be configured to provide at least one of a pattern and/or a texture and/or a color. The component may comprise a light-diffusing layer (1) between the light-emitting unit and the lens layer or (2) between the lens layer and the imaging layer.

The present invention relates to a component for a vehicle interior comprising a light source configured to provide light; and a composite structure comprising a base layer and an intermediate layer and a cover layer. The light source may be configured to transmit light into the composite structure. The base layer may comprise a surface comprising a set of elements. The composite structure may be configured to present a composite visual effect at the cover layer. The composite visual effect may comprise (a) a visual effect contributed by the composite structure and/or (b) a visual effect contributed by light from the light source. The visual effect contributed by the composite structure may comprise (a) a visual effect without light from the light source and (b) a visual effect with light from the light source. The visual effect without light from the light source may comprise a visual effect from ambient light in the vehicle interior. The visual effect without light from the light source may comprise a visual effect from ambient light in the vehicle interior into the composite structure. The visual effect without light from the light source may comprise concealment of visibility into the composite structure. The visual effect without light from the light source may comprise concealment of the base layer of the composite structure. The visual effect with light from the light source may comprise a visual effect from light transmitted through the composite structure. The visual effect from light transmitted through the composite structure may comprise a dynamic visual effect. The light source may be configured to provide a lighting effect. The lighting effect may be visible at the cover layer. The lighting effect may comprise light visible at the cover layer. The lighting effect may comprise variation in a form of light transmission. The light source may comprise at least one of (a) an LED; (b) an LED array; (c) a set of LEDs; (d) a light display. The lighting effect may comprise variation of light across the composite structure. The lighting effect may comprise variation of color of light across the composite structure. The lighting effect may comprise variation of intensity of light across the composite structure. The lighting effect may comprise variation of pattern of light across the composite structure. The lighting effect may comprise motion of light across the composite structure. The lighting effect may comprise flowing of light across the composite structure. The lighting effect may comprise sequencing of light across the composite structure. The lighting effect may comprise intermittence of light across the composite structure. The lighting effect may comprise at least one of intensity and/or color and/or pattern and/or imagery and/or variation of intensity and/or variation of color and/or variation of pattern and/or variation of imagery. The lighting effect may comprise a backlight for the composite structure. The lighting effect may comprise a tunnel effect for the composite structure. The light source may comprise a light module. The light source may be configured to transmit light in a form configured to provide the dynamic visual effect. The form may comprise at least one of color and/or amplitude and/or intensity and/or frequency and/or segmentation and/or sequence and/or pattern and or imagery. The form may comprise variation of at least one of color and/or amplitude and/or intensity and/or frequency and/or segmentation and/or sequence and/or pattern and/or imagery. The form may comprise a lighting effect. The visual effect contributed by the composite structure may comprise (a) a visual effect contributed by the base layer and (b) a visual effect contributed by the intermediate layer. The visual effect contributed by the composite structure may comprise (a) a visual effect contributed by the base layer and (b) a visual effect contributed by the intermediate layer and a visual effect contributed by the cover layer. The composite structure may comprise a diffuser layer (a) between the light source and the base layer and/or (b) between the base layer and the intermediate layer. The base layer may be configured to transmit light from the light source. The base layer may comprise a light-transmissive material. The base layer may be configured to provide dispersion of light transmitted from the light source. The set of elements of the surface of the base layer may be configured to provide dispersion of light transmitted from the light source. The base layer may be configured to provide reflection of light transmitted from the light source. The set of elements of the surface of the base layer may be configured to provide reflection of light transmitted from the light source. The base layer may be configured to provide refraction of light transmitted from the light source. The set of elements of the surface of the base layer may be configured to provide refraction of light transmitted from the light source. The base layer may be configured to transmit light from the light source into the intermediate layer. The base layer may comprise a lens layer. The surface of the base layer may comprise an emergent surface. The base layer may comprise an incident surface. The surface of the base layer may comprise a curved surface and/or a prismatic surface. The emergent surface of the base layer may comprise a prismatic surface. The surface of the base layer may comprise a curved surface and/or a prismatic surface. The surface of the base layer may comprise a prismatic surface. The base layer may comprise a lens layer comprising an incident surface and/or an emergent surface configured as a curved surface and/or a prismatic surface. The set of elements of the surface of the base layer may comprise a set of projections. The set of elements of the surface of the base layer may comprise a variation of the set of projections. The set of projections may comprise at least one of a set of prismatic structures. The set of prismatic structures may comprise at least one of (a) polygonal structures and/or (b) triangular structures and/or (c) quadrangular prismatic structures. The set of prismatic structures may comprise at least one of (a) structures forming an uneven regular surface and/or (b) structures forming an irregular prismatic surface and/or (c) structures configured to converge light from the light source and/or (d) structures configured to diverge the light from the light source. The set of elements of the surface of the base layer may comprise a set of prismatic elements. The set of elements of the surface of the base layer may comprise a variation of the set of prismatic elements. The base layer may be configured to provide a visual effect comprising a light dispersion effect. The light dispersion effect may comprise reflection and/or refraction of light. The light dispersion effect may comprise reflection. The light dispersion effect may comprise refraction. The light dispersion effect may comprise reflection and refraction of light from the light source. The visual effect may comprise a crystal effect. The base layer may be configured to provide a visual effect comprising a prismatic effect. The prismatic effect may be provided by the set of elements of the surface of the base layer. The intermediate layer may be configured to transmit light from the base layer. The intermediate layer may comprise a light-transmissive material. The intermediate layer may be configured to provide projection of light transmitted from the base layer. The intermediate layer may be configured to transmit light from the base layer into the cover layer. The intermediate layer may be configured to provide an imaging layer. The imaging layer may be configured to present a projection of light. The imaging layer may comprise a coating. The imaging layer may comprise a film. The imaging layer may comprise at least one of a color and/or a pattern and/or a texture and/or imagery. The pattern may comprise a texture. The imaging layer may comprise a pattern layer. The pattern layer may comprise a texture. The imaging layer may comprise a decorative layer. The imaging layer may be visible through the cover layer. The intermediate layer may be configured to present a projection of light transmitted through the base layer. The intermediate layer may comprise a surface configured for presentation of projected light. The intermediate layer may comprise a surface configured for presentation of an image. The intermediate layer may comprise at least one of a color and/or a pattern and/or texture. The pattern may comprise a texture. The intermediate layer may comprise a variation of at least one of color and/or pattern. The intermediate layer may comprise a decorative layer. The decorative layer may be visible through the cover layer. The intermediate layer may comprise a diffuser layer. The diffuser layer may be configured to diffuse light visible through the cover layer. The diffuser layer may be configured to enhance a viewing angle of light visible through the cover layer. The intermediate layer may be configured to provide a visual effect comprising at least one of (a) a projection effect (b) a decorative effect and/or (c) a color effect and/or (d) a pattern effect and/or (e) a light dispersion effect from the base layer and/or (f) a prismatic effect from the base layer and/or (g) a lighting effect from the light source and/or (h) a lighting effect from transmission of light from the light source through the base layer. A lighting effect from transmission of light from the light source through the base layer may comprise projection of light within the intermediate layer. The projection effect may comprise a two-dimensional effect and/or three-dimensional effect. The cover layer may comprise a surface for the composite structure. The cover layer may comprise a light-transmissive material. The cover layer may comprise at least one of a color and/or a pattern and/or texture and/or a shape and/or a thickness. The pattern may comprise a texture. The cover layer may comprise a variation of at least one of color and/or pattern and/or shape and/or thickness. The cover layer may comprise a prism shape. The cover layer may be configured to provide a visual effect. The visual effect may be visible at a viewing angle at the surface of the cover layer. The visual effect may comprise a surface effect. The surface effect may comprise at least one of (a) a decorative effect and/or (b) reflection of light and/or (c) transmission of light and/or (d) transparency and/or (e) semi-transparency and/or (f) gloss and/or (g) light from the light source and/or (h) a vanish effect for the base layer and/or (i) an element configured to present a visual effect. The cover layer may comprise an element configured to present the visual effect. The visual effect may comprise a depth effect. The element of the cover layer may comprise an image. The element of the cover layer may comprise an engraved image. The cover layer may comprise at least one of a color and/or a pattern and/or imagery. Imagery may comprise an image formed as the element of the cover layer. The element configured to present the visual effect of the cover layer may be within the cover layer. The element configured to present the visual effect of the cover layer may be visible at a viewing angle at a surface of the cover layer. The surface effect may comprise at least one of reflection of ambient light within the vehicle interior. The cover layer may comprise a coating. The cover layer may be configured to reflect ambient light within the vehicle interior. The cover layer may be configured to provide a visual effect comprising at least one of (a) a surface effect; (b) a depth effect and/or (c) a color effect and/or (d) a pattern effect and/or (e) a light dispersion effect from the base layer and/or (f) a prismatic effect from the base layer and/or (g) a projection effect from the intermediate layer and/or (h) a decorative effect from the intermediate layer and/or (i) a color effect from the intermediate layer and/or (j) a pattern effect from the intermediate layer and/or (k) a lighting effect from the light source and/or (l) a lighting effect from transmission of light from the light source through the base layer and/or (m) a lighting effect from transmission of light from the light source through the base layer and from the intermediate layer. The composite visual effect may comprise a combined visual effect of (a) visual effect of the base layer and/or (b) visual effect of the intermediate layer and/or (c) visual effect of the cover layer. The composite visual effect may comprise a combined visual effect of (a) visual effect of the base layer and/or (b) visual effect of the intermediate layer and/or (c) visual effect of the cover layer and/or (d) visual effect of light from the light source and/or (e) visual effect of ambient light in the vehicle interior. The composite visual effect may comprise a combined visual effect of (a) a light dispersion effect from the base layer and/or (b) a prismatic effect from the base layer and/or (c) a projection effect from the intermediate layer and/or (d) a decorative effect from the intermediate layer and/or (e) a color effect from the intermediate layer and/or (f) a pattern effect from the intermediate layer and/or (g) a surface effect from the cover layer and/or (h) a depth effect from the cover layer and/or (i) a color effect from the cover layer and/or (j) a pattern effect from the cover layer and/or (k) a lighting effect from the light source and/or (l) a lighting effect from transmission of light from the light source through the base layer and/or (m) a lighting effect from transmission of light from the light source through the base layer and from the intermediate layer and/or (n) a day effect and/or (m) a night effect and/or (o) a stereoscopic effect. The day effect may comprise reflection of ambient light in the vehicle interior. The night effect may comprise light from the light source. The stereoscopic effect may comprise a multi-level visual effect within the composite structure. The stereoscopic effect may comprise a depth effect within the composite structure. The stereoscopic effect may comprise an element within the composite structure. The intermediate layer may comprise a translucent material; the translucent material may be configured so that the base layer is not visible at the cover layer. The intermediate layer may comprise a flat surface and/or a prismatic surface to enable the projection on an imaging layer to present a two-dimensional effect and/or three-dimensional effect. The base layer comprising the surface may comprise a lens layer comprising a prismatic surface; the prismatic surface of the lens layer may comprise the set of elements of the surface of the base layer projecting at an acute angle. The intermediate layer may comprise at least one of materials of polycarbonate, acrylic, acrylonitrile-butadiene-styrene, nylon, polypropylene, polyurethane, metal, printing ink, wood, and fabric. The cover layer may comprise at least one of materials of polycarbonate, acrylic, acrylonitrile-butadiene-styrene, nylon, polypropylene, polyurethane, metal, printing ink, wood, fabric, epoxy resin, and UV paint. The intermediate layer and the cover layer may be (a) separated by a gap and/or (b) bonded by an optical adhesive.

The present invention relates to a component for a vehicle interior comprising a light-emitting unit; a lens layer comprising an incident surface and/or an emergent surface configured as a curved surface and/or a prismatic surface; an imaging layer configured to receive light emitted by the light-emitting unit and projected on the imaging layer through the lens layer to form a projection; and a cover layer. The projection on the imaging layer may be rendered visible through the cover layer. The imaging layer may comprise a translucent material; the translucent material may be configured so that the lens layer is not visible. The imaging layer may comprise a surface configured to enable the projection on the imaging layer to present a multi-dimensional effect. The lens layer may comprise the prismatic surface comprising prismatic elements at an acute angle; the prismatic elements may be configured with an R value between 0.01-0.09 mm. The light-emitting unit may be configured to provide at least one dynamic effect comprising a segmented light effect and/or an active light effect and/or and an intermittent light-dark effect. The cover layer and/or the imaging layer may be configured to provide at least one of a pattern and/or a texture and/or a color. The component may comprise a light-diffusing layer (1) between the light-emitting unit and the lens layer or (2) between the lens layer and the imaging layer.

The present invention relates to a component for a vehicle interior comprising a light-emitting unit; a lens layer comprising an incident surface and/or an emergent surface configured as a curved surface and/or a prismatic surface; an imaging layer configured to receive light emitted by the light-emitting unit and projected on the imaging layer through the lens layer to form a projection; and a cover layer. The projection on the imaging layer may be rendered visible through the cover layer. The imaging layer may comprise a translucent material; the translucent material may be configured so that the lens layer is not visible. The imaging layer may comprise a flat surface and/or a prismatic surface to enable the projection on the imaging layer to present a two-dimensional effect and/or three-dimensional effect. The lens layer may comprise the prismatic surface; the prismatic surface of the lens layer may comprise an acute angle; the acute angle may comprise an R value between 0.01-0.09 mm. The imaging layer may be formed by paint spraying or by physical vapor deposition plating. The imaging layer may comprise at least one of materials of polycarbonate, acrylic, acrylonitrile-butadiene-styrene, nylon, polypropylene, polyurethane, metal, printing ink, wood, and fabric. The light-emitting unit may be configured to provide monochromatic light or polychromatic light. The light-emitting unit may be configured to provide at least one dynamic effect comprising a running light effect and/or a breathing light effect and/or an intermittent light-dark effect. The cover layer may comprise at least one of materials of polycarbonate, acrylic, acrylonitrile-butadiene-styrene, nylon, polypropylene, polyurethane, metal, printing ink, wood, fabric, epoxy resin, and UV paint. The cover layer may comprise a thickness of 0.5-50 mm and/or a thickness preferably of 1-15 mm. The cover layer may comprise (a) a protective material comprising (1) a thickness of 0.05-5 mm and/or (2) a thickness of 0.1-2 mm and (3) a hardness of 1H or above; or (b) a protective material comprising (1) a thickness of 0.05-5 mm and/or (2) a thickness of 0.1-2 mm and (3) with weather resistance, stain resistance, chemical resistance or scratch resistance. The cover layer and/or the imaging layer may be configured to provide any one or more of a pattern and/or a texture and/or a color. The component may comprise a light-homogenizing layer (1) between the light-emitting unit and the lens layer or (2) between the lens layer and the imaging layer. The imaging layer and the cover layer may be separated by a gap and/or the imaging layer and the cover layer may be bonded by an optical adhesive. The imaging layer and the lens layer may be separated by a gap and/or the imaging layer and the lens layer may be parallel and/or the imaging layer and lens layer may be at an angle. The imaging layer may comprise a translucent material; the translucent material may be configured so that the lens layer is not visible. The imaging layer may comprise a surface configured to enable the projection on the imaging layer to present a multi-dimensional effect. The lens layer may comprise the prismatic surface comprising prismatic elements at an acute angle; the prismatic elements may be configured with an R value between 0.01-0.09 mm. The light-emitting unit may be configured to provide at least one dynamic effect comprising a segmented light effect and/or an active light effect and/or and an intermittent light-dark effect. The cover layer and/or the imaging layer may be configured to provide at least one of a pattern and/or a texture and/or a color. The component may comprise a light-diffusing layer (1) between the light-emitting unit and the lens layer or (2) between the lens layer and the imaging layer.

The present invention relates to a component for a vehicle interior comprising a light-emitting unit, a lens layer comprising an incident surface and/or an emergent surface configured as a curved surface and/or a prismatic surface; an imaging layer configured to receive light emitted by the light-emitting unit, and a cover layer. Light projected on the imaging layer through the lens layer may form a projection. The projection on the imaging layer may be rendered visible through the cover layer. The imaging layer may comprise a translucent material to render the lens layer invisible. The imaging layer may comprise a flat surface and/or a prismatic surface to enable the projection on the imaging layer to present a two-dimensional and/or three-dimensional effect. The prismatic surface of the lens layer may comprise an acute angle, the acute angle being an R angle having an R value set to be 0.01-0.09 mm. The imaging layer may be formed by paint spraying or by physical vapor deposition plating. The imaging layer may comprise at least one of materials of polycarbonate, acrylic, acrylonitrile-butadiene-styrene, nylon, polypropylene, polyurethane, metal, printing ink, wood, and fabric. The light-emitting unit may be configured to provide monochromatic or polychromatic light. The light-emitting unit may be configured to provide at least one of dynamic effects of a running light effect, a breathing light effect, and an intermittent light-dark effect. The cover layer may comprise at least one of materials of polycarbonate, acrylic, acrylonitrile-butadiene-styrene, nylon, polypropylene, polyurethane, metal, printing ink, wood, fabric, epoxy resin, and UV paint. The cover layer may comprise a thickness of 0.5-50 mm, preferably 1-15 mm. The cover layer may comprise a protective material having a thickness of 0.05-5 mm, preferably 0.1-2 mm, and a hardness of 1H or above, or may comprise at least one of protective materials having a thickness of 0.05-5 mm, preferably 0.1-2 mm, and with weather resistance, stain resistance, chemical resistance or scratch resistance. The cover layer and/or the imaging layer may be configured to provide any one or more of patterns, textures, and colors. The component may comprise a light-homogenizing layer disposed between the light-emitting unit and the lens layer or between the lens layer and the imaging layer. The imaging layer and the cover layer may be disposed at an interval. The imaging layer and the cover layer may be bonded by means of an optical adhesive. The imaging layer and the lens layer may be disposed at an interval. The imaging layer and the lens layer may be arranged parallel to each other or at an angle.

FIGURES

DESCRIPTION

Figure 1:
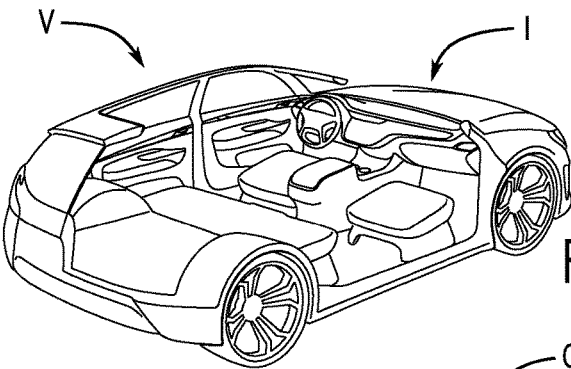
FIG. 1 is a schematic perspective view of a vehicle according to an exemplary embodiment.
Figure 2:
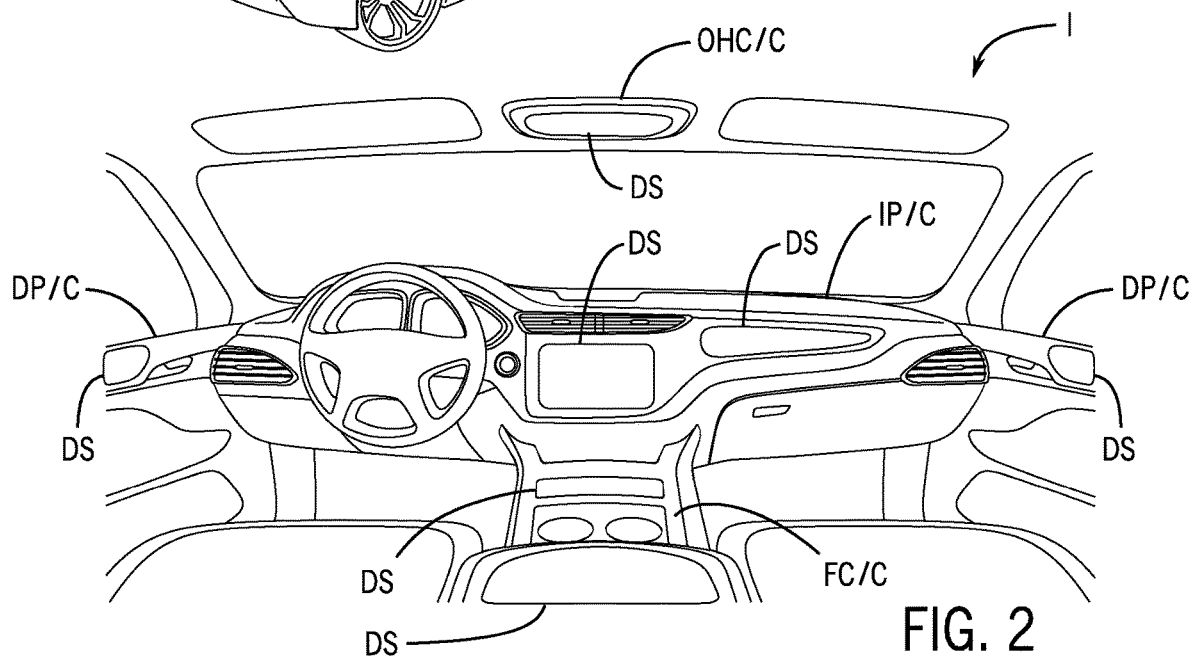
FIG. 2 is a schematic partial perspective view of a vehicle interior according to an exemplary embodiment.
Figure 3A:
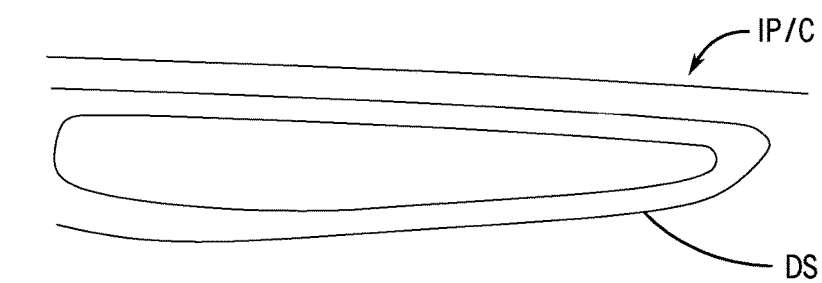
FIGS. 3A and 3B are schematic partial plan views of a component shown as comprising a display system according to an exemplary embodiment.
Figure 3B:
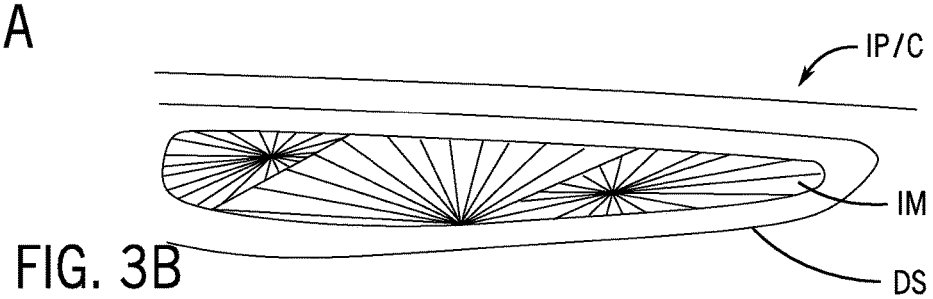
Figure 4A:
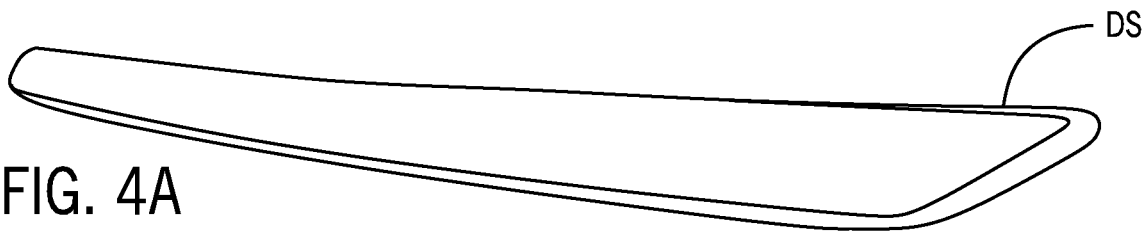
FIGS. 4A and 4B are schematic partial plan views of a component shown as comprising a display system according to an exemplary embodiment.
Figure 4B:
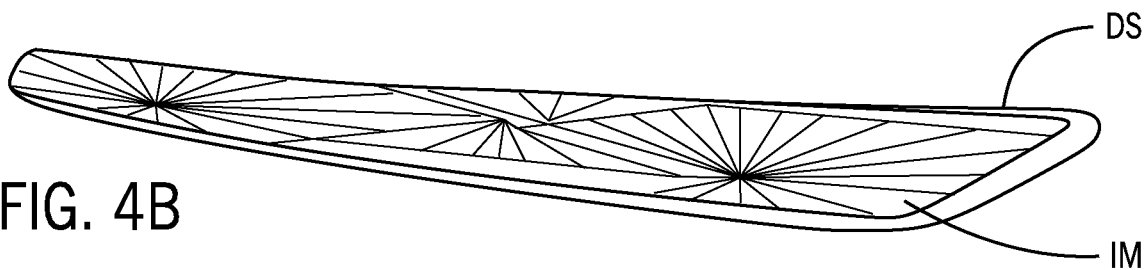
Figure 5A:
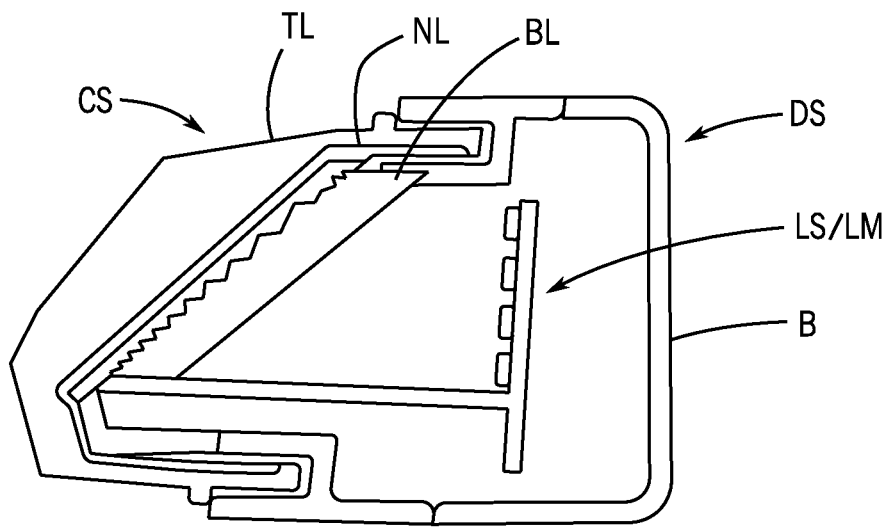
FIGS. 5A and 5B are schematic section views of a component shown as comprising a display system according to an exemplary embodiment.
Figure 5B:
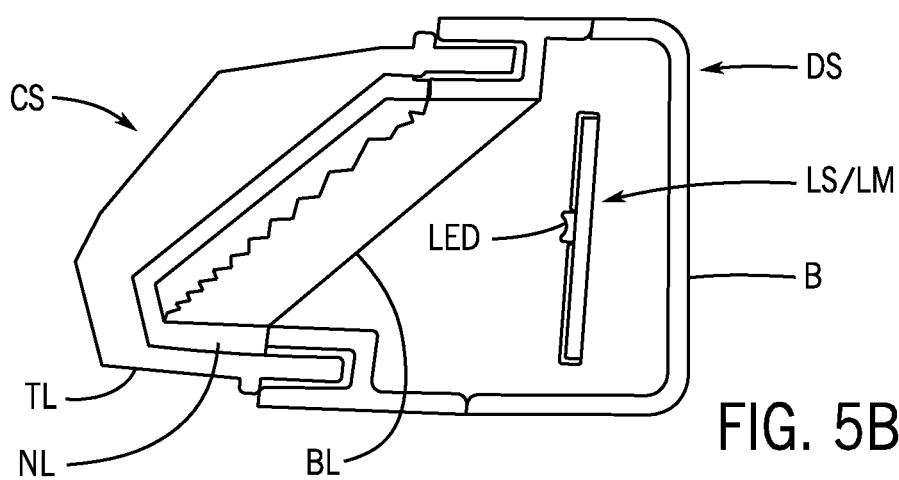
Figure 6:
FIG. 6 is a schematic partial plan view of a component shown as comprising a display system according to an exemplary embodiment.
Figures 7A, 7B:
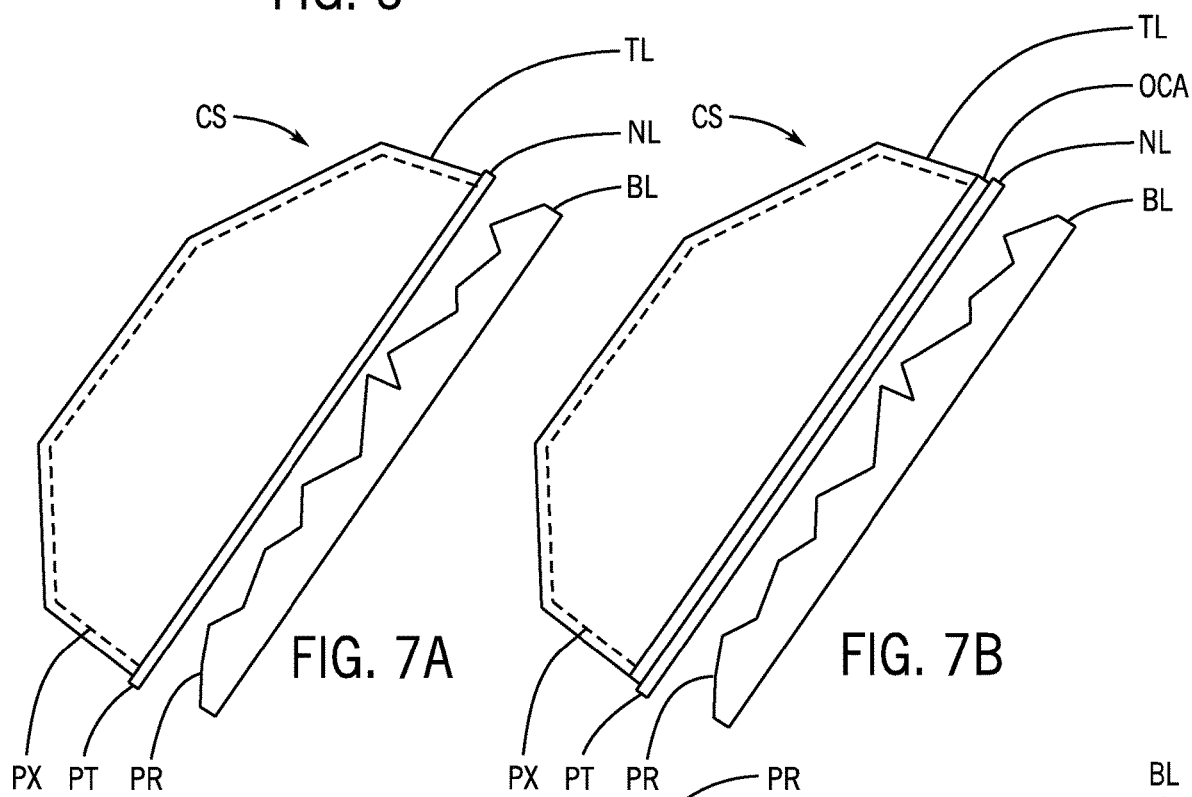
FIGS. 7A and 7B are schematic section views of a composite structure of a component comprising a display system according to an exemplary embodiment.
Figure 8:
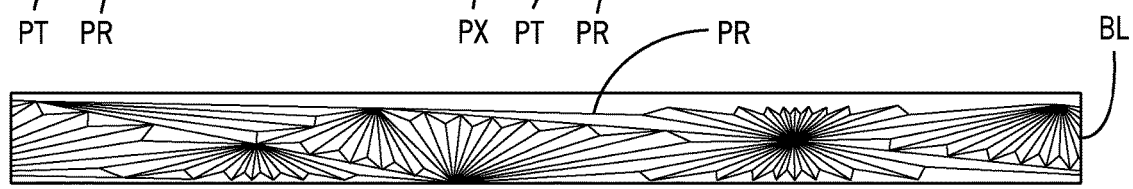
FIG. 8 is a schematic partial plan view of a base layer of a composite structure of a component comprising a display system according to an exemplary embodiment.
Figure 9:
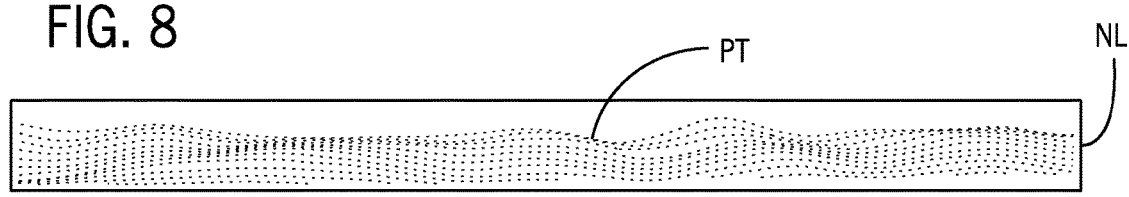
FIG. 9 is a schematic partial plan view of an intermediate layer of a composite structure of a component comprising a display system according to an exemplary embodiment.
Figure 10A:
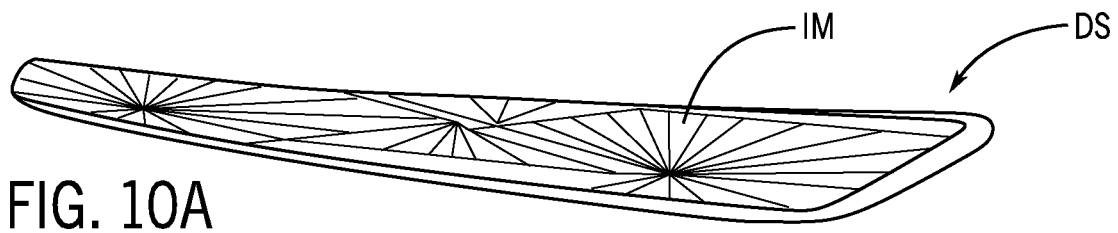
FIGS. 10A and 10B are schematic partial plan views of a component shown as comprising a display system according to an exemplary embodiment.
Figure 10B:
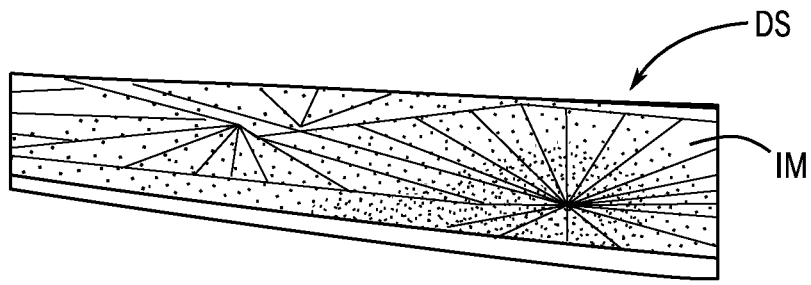
Figure 11A:
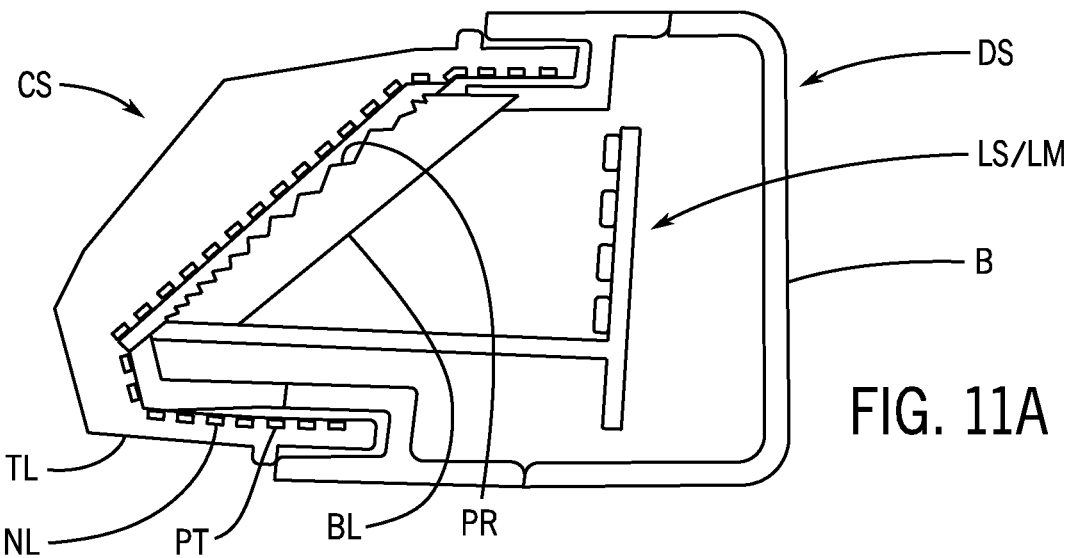
FIGS. 11A and 11B are schematic section views of a component shown as comprising a display system according to an exemplary embodiment.
Figure 11B:
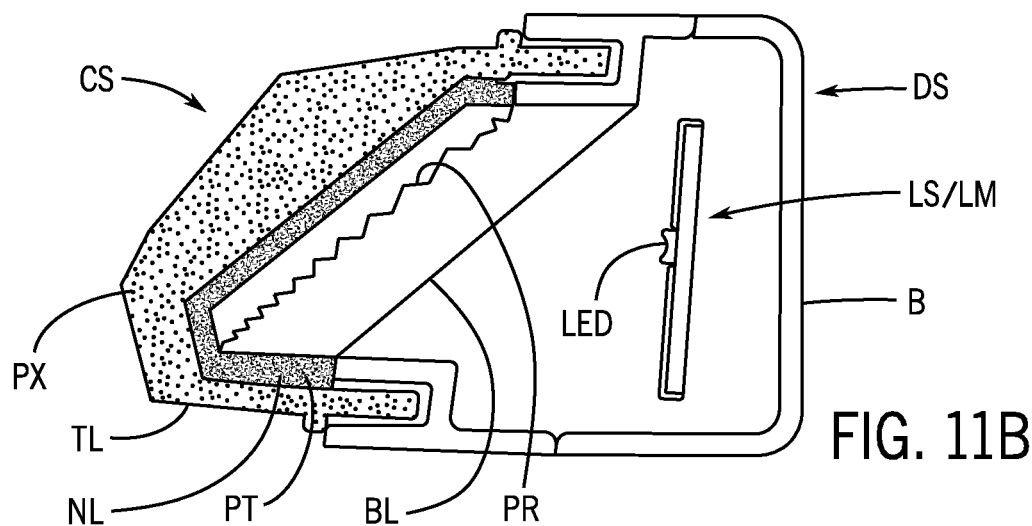
Figure 12A:
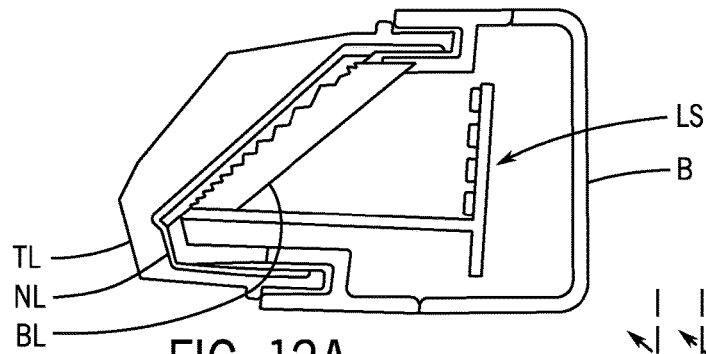
FIGS. 12A through 12D are schematic section views of operation of a component shown as comprising a display system according to an exemplary embodiment.
Figure 12B:
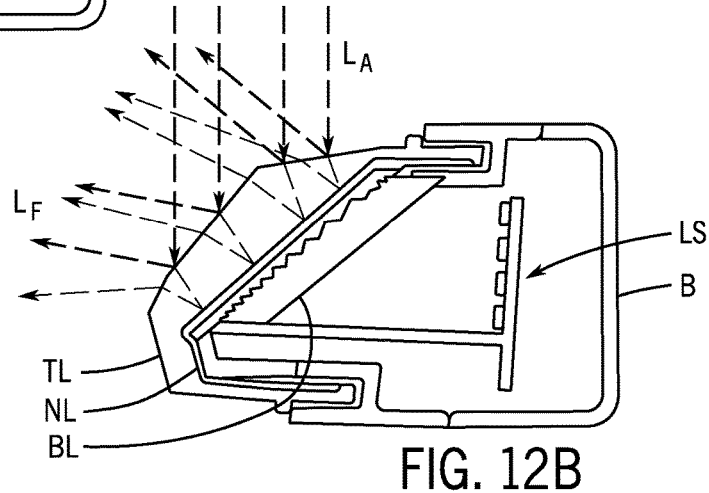
Figure 12C:
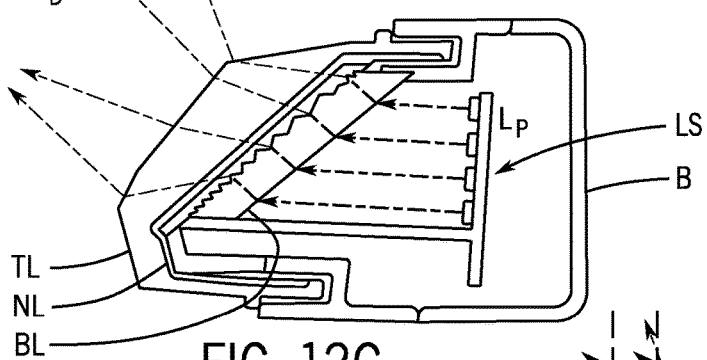
Figure 12D:
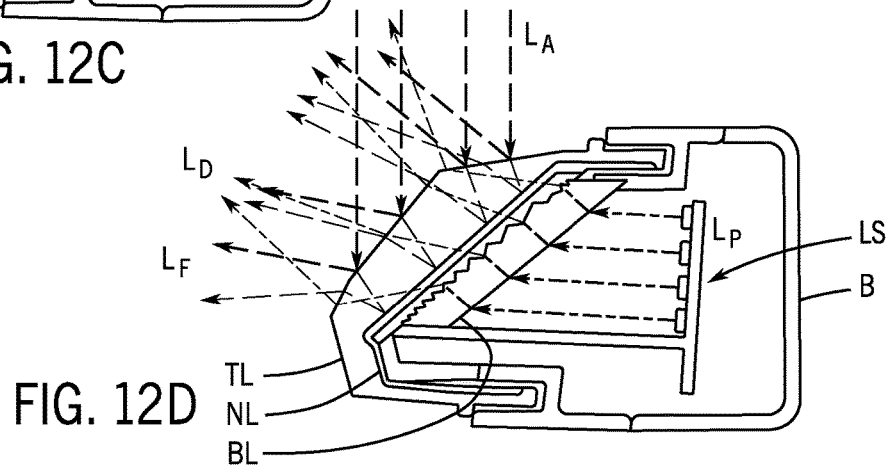
Figure 13:
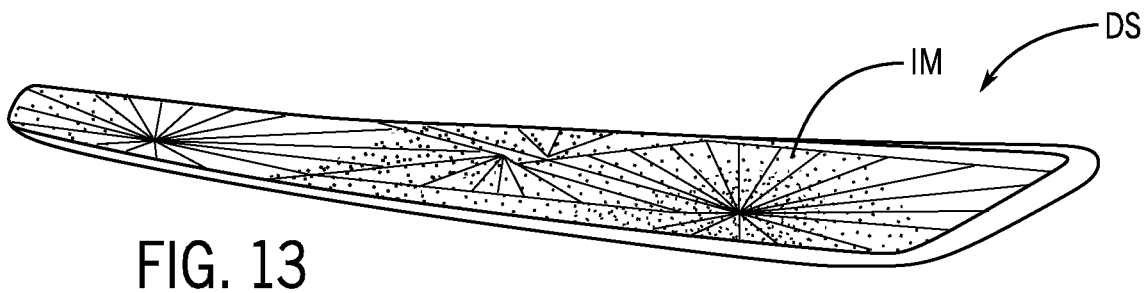
FIG. 13 is a schematic perspective view of a component shown as comprising a display system according to an exemplary embodiment.
Figure 13A:
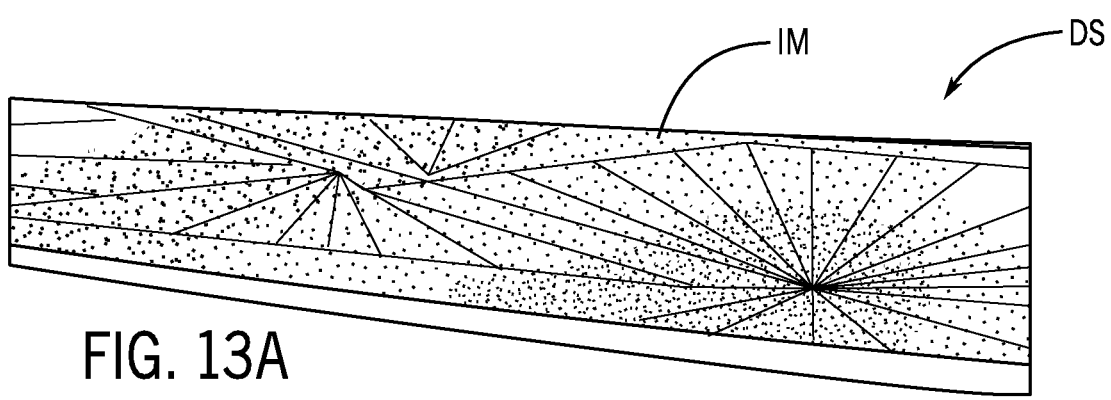
FIGS. 13A through 13C are schematic partial plan views of operation of a component shown as comprising a display system according to an exemplary embodiment.
Figure 13B:
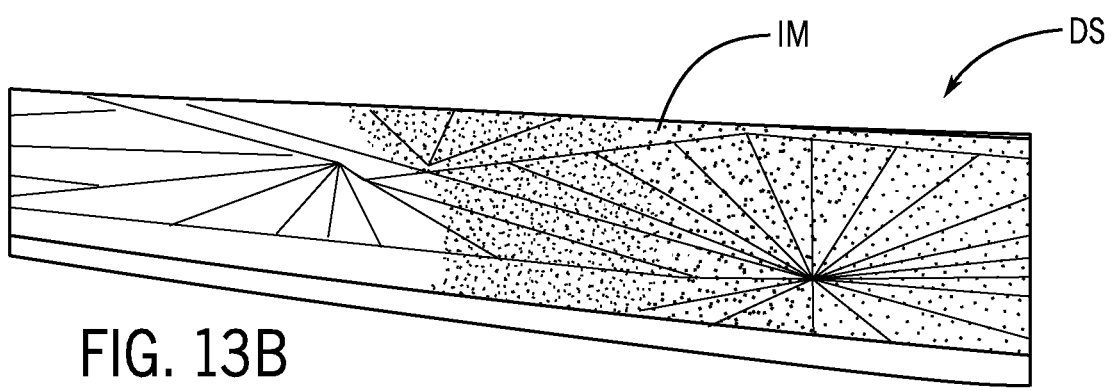
Figure 13C:
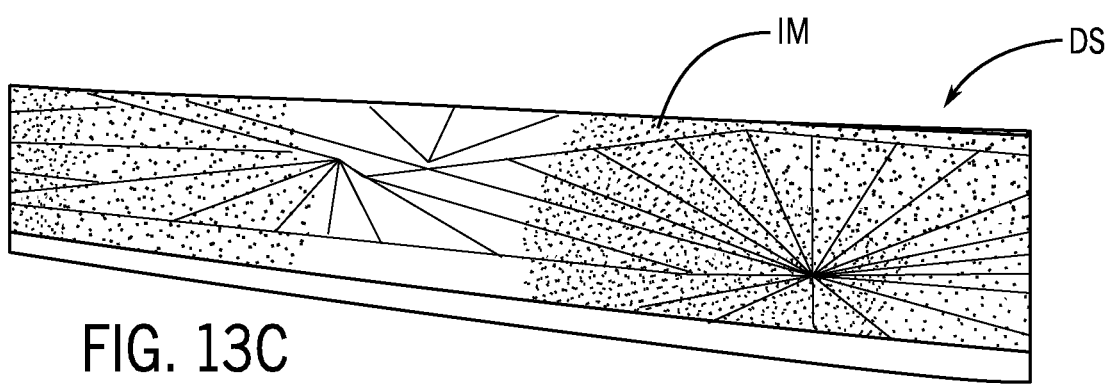
Figure 14:
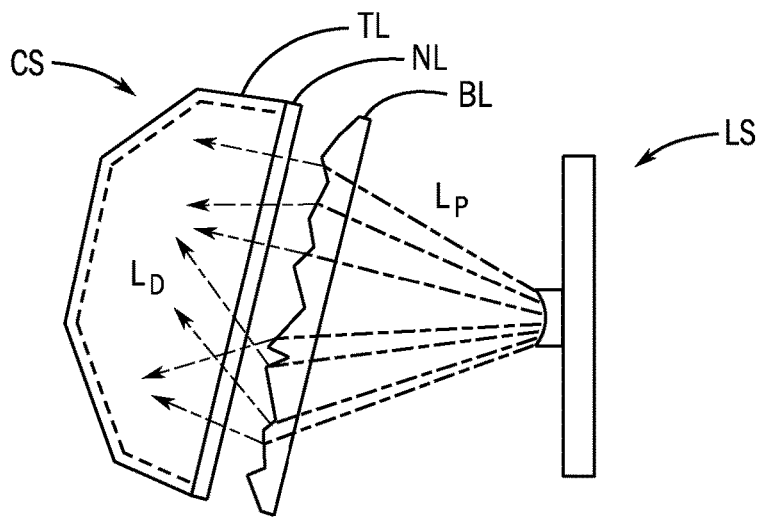
FIG. 14 is a schematic section view of operation of a component shown as comprising a display system according to an exemplary embodiment.
Figure 15:
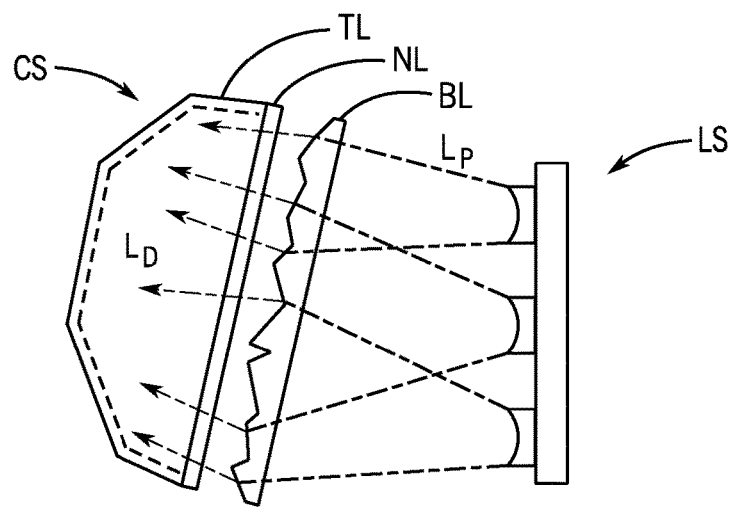
FIG. 15 is a schematic section view of operation of a component shown as comprising a display system according to an exemplary embodiment.
Figure 16:
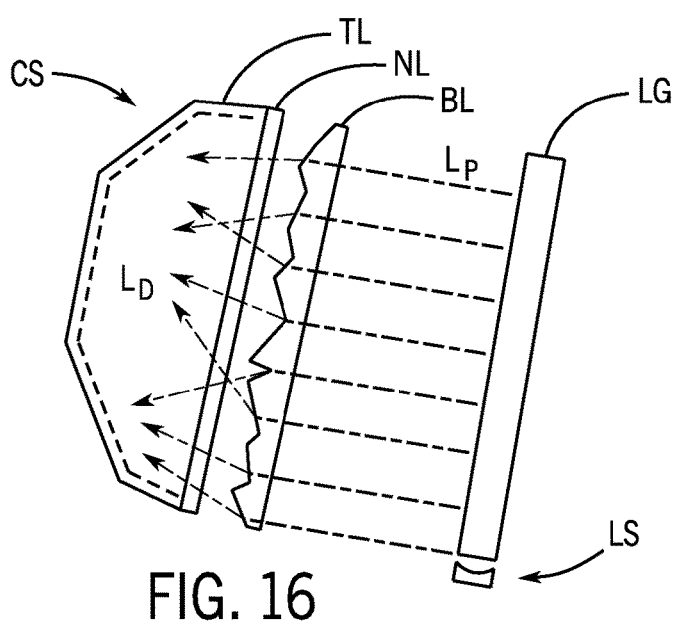
FIG. 16 is a schematic section view of operation of a component shown as comprising a display system according to an exemplary embodiment.
Figures 17A, 17B, 18A, 18B, 19A, 19B, 20A, 20B, 21A, 21B:
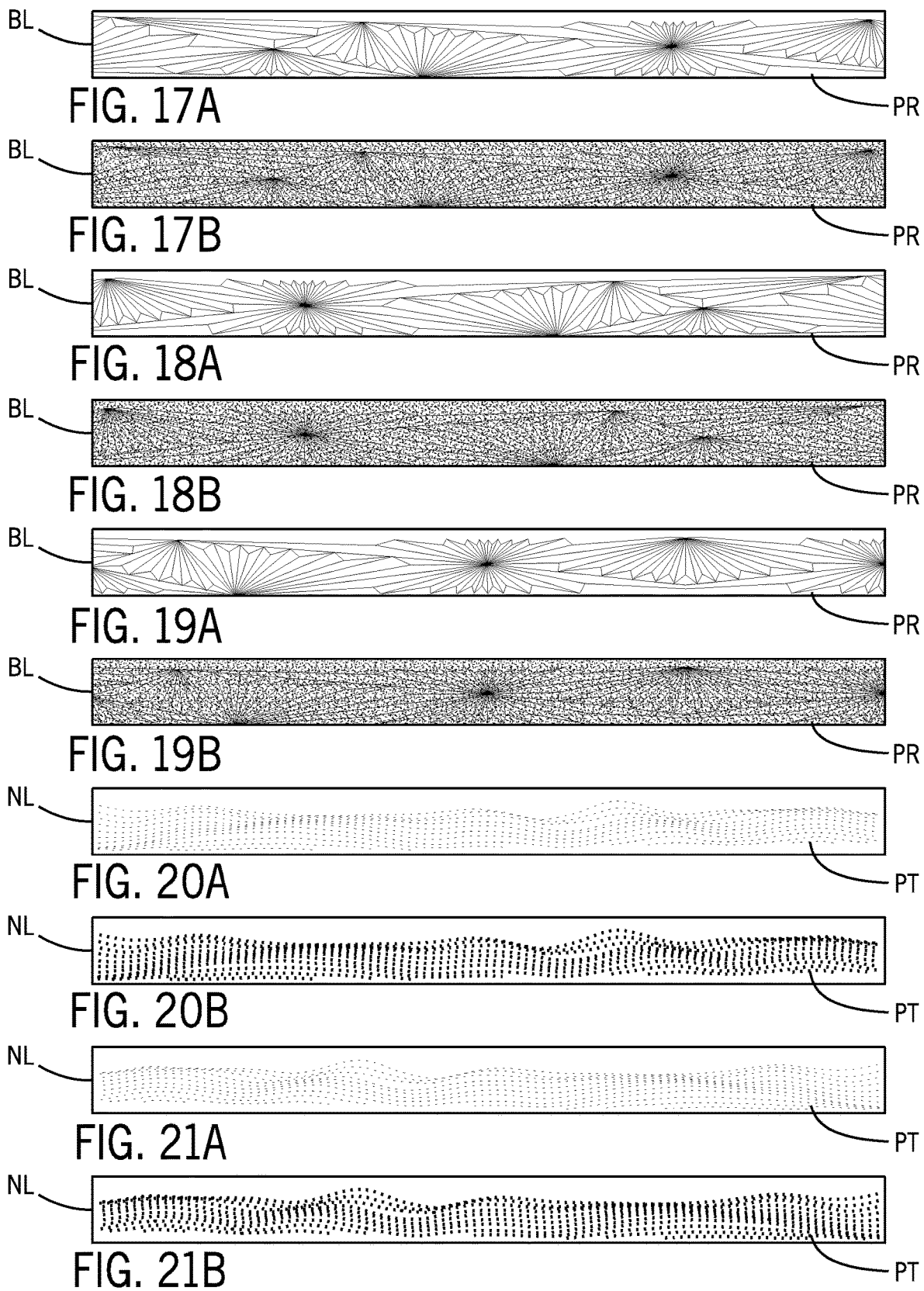
FIGS. 17A and 17B are schematic plan views of the base layer of the composite structure of the display system according to an exemplary embodiment.
FIGS. 18A and 18B are schematic plan views of the base layer of the composite structure of the display system according to an exemplary embodiment.
FIGS. 19A and 19B are schematic plan views of the base layer of the composite structure of the display system according to an exemplary embodiment.
FIGS. 20A and 20B are schematic plan views of the intermediate layer of the composite structure of the display system according to an exemplary embodiment.
FIGS. 21A and 21B are schematic plan views of the intermediate layer of the composite structure of the display system according to an exemplary embodiment.
Figure 22A:
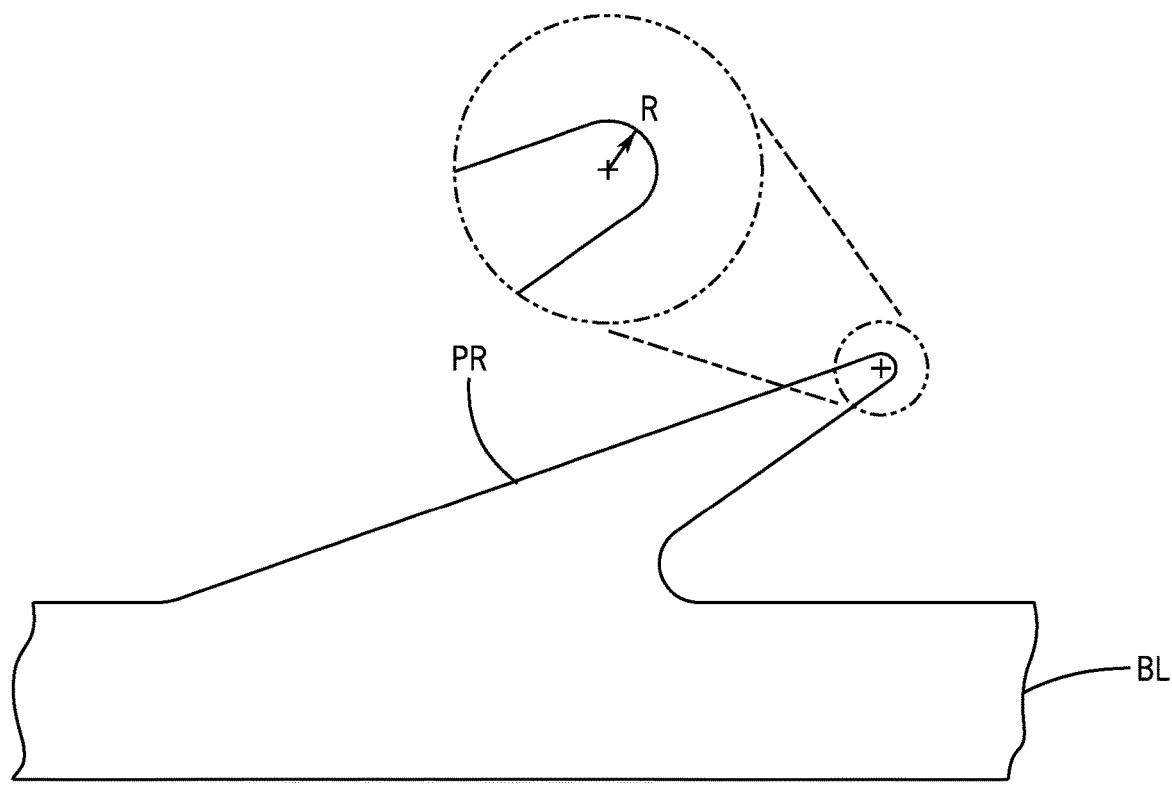
FIGS. 22A and 22B are schematic partial section views of a base layer of a composite structure of a component comprising a display system according to an exemplary embodiment.
Figure 22B:
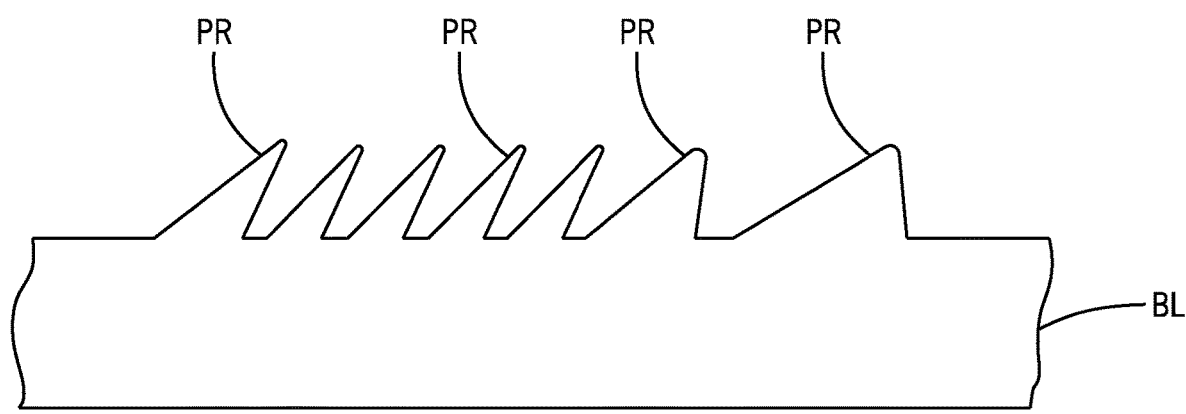
Figure 23:
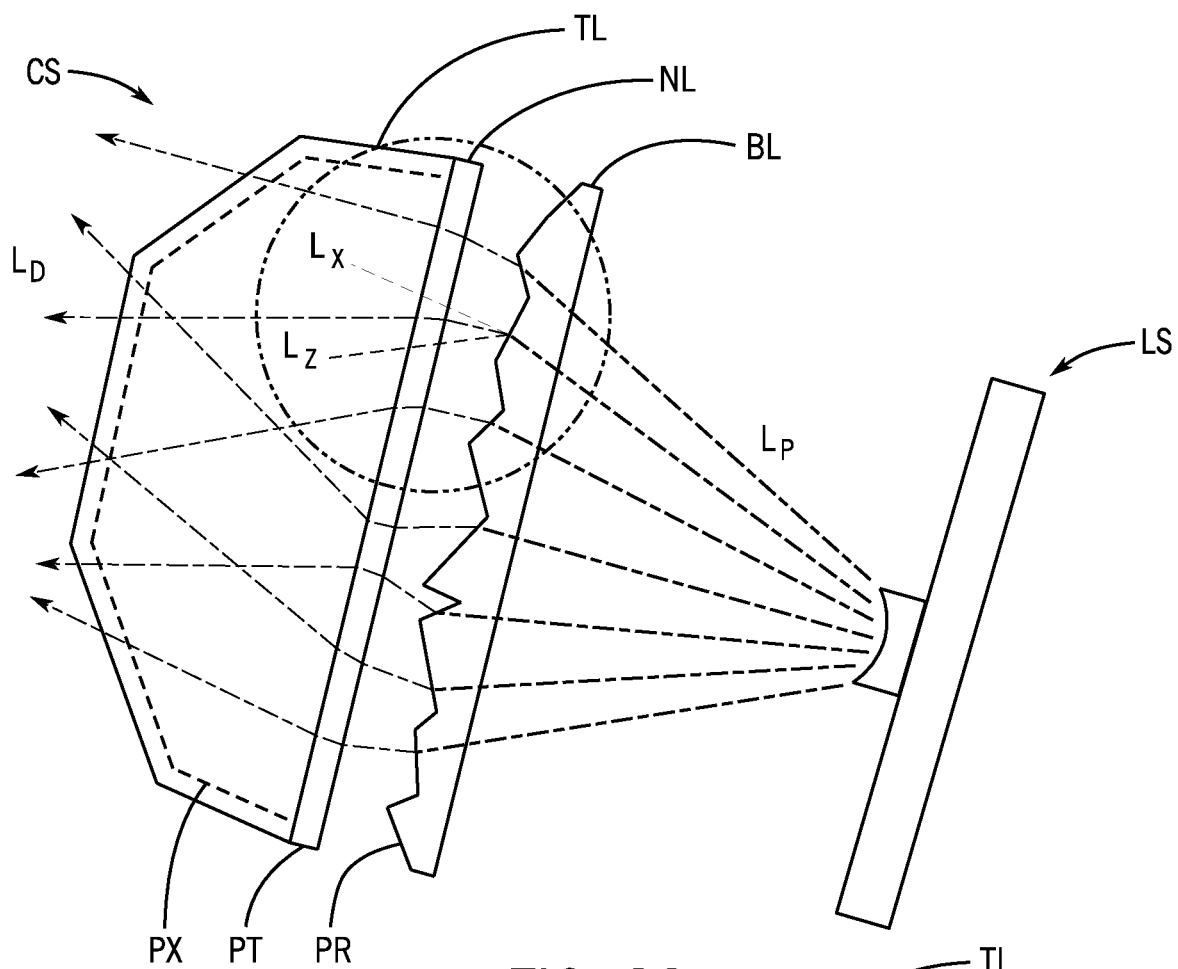
FIG. 23 is a schematic section view of operation of a composite structure of a display system according to an exemplary embodiment.
Figure 23A:
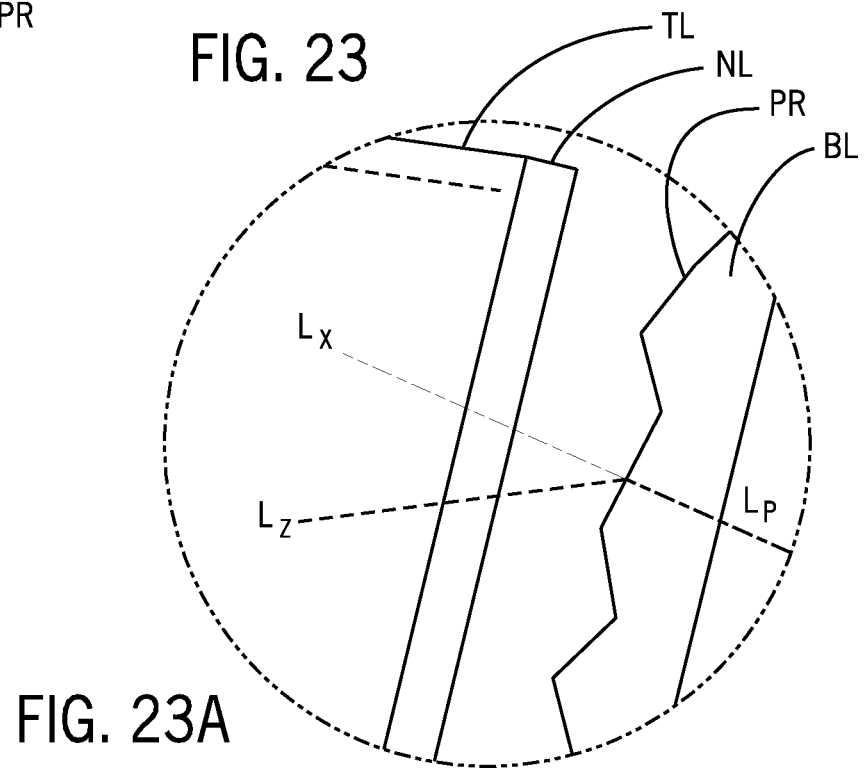
FIG. 23A is a schematic cutaway section view of operation of a component shown as comprising a display system according to an exemplary embodiment.
Figure 24:
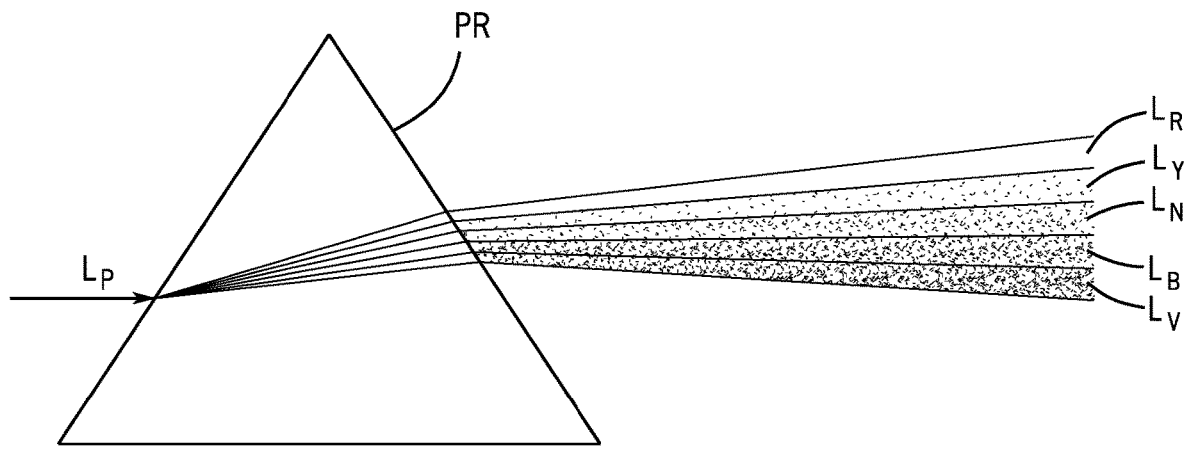
FIG. 24 is a schematic diagram of the operation of a prismatic element according to an exemplary embodiment.
Figure 25:
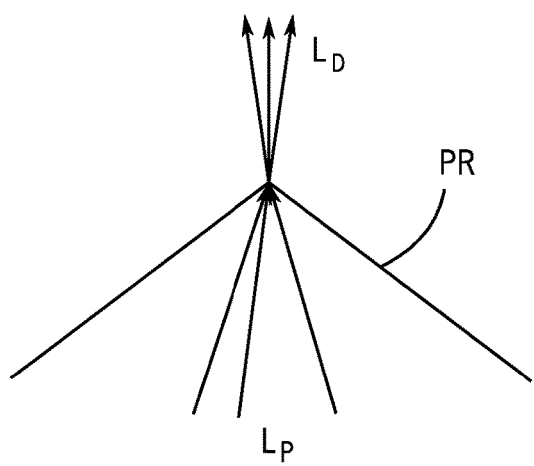
FIG. 25 is a schematic diagram of the operation of a prismatic element according to an exemplary embodiment.
Figures 26A, 26B:
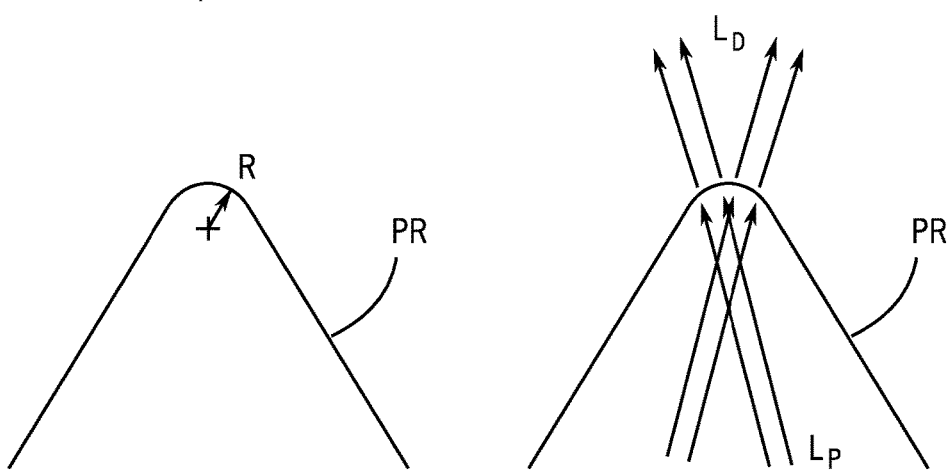
FIGS. 26A and 26B are schematic partial section views of operation of a prismatic element for a composite structure of a display system according to an exemplary embodiment.

According to an exemplary embodiment as shown schematically in FIGS. 1 and 2, a vehicle V is shown comprising an interior I comprising components C such as an instrument panel IP, door panel DP, floor console FC and overhead console OHC; as indicated schematically in FIGS. 2, 3A-3B, 4A-4B and 6, components C may be configured to comprise a display system DS configured to present a visual effect shown as image IM within the vehicle interior.

According to an exemplary embodiment as shown schematically in FIGS. 2, 3A-3B, 4A-4B, 5A-5B, 6, 10A-10B, 11A-11B, 12A-12D, 13 and 13A-13C, component C for the vehicle interior may comprise display system DS; display system DS may comprise a base/housing B and a light source LS/LM and a composite structure CS; composite structure CS may comprise a base layer BL and an intermediate layer NL and a cover layer TL. See also FIGS. 5A-5B, 7A-7B, 11A-11B, 14, 15, 16, 23, 23A, 27, 28, 29 and 30. The light source LS may comprise a control module LM and a lamp such as an LED array and/or light guide LG configured transmit light into the composite structure CS; the base layer BL may comprise a surface comprising a set of elements such as projections PR; the intermediate layer NL may comprise a visual object such as a pattern PT; the cover layer TL may comprise a visual object such as a pattern PX.

As shown schematically in FIGS. 3A-3B, 4A-4B, 6, 10A-10B, 12A-12D, 13, 13A-13C, 14, 15, 16, 23, 23A, 27, 28, 29 and 30, the composite structure CS of the display system DS may comprise layers comprising light-transmissive materials configured to present a composite visual effect shown as image IM at the cover layer TL; the composite visual effect of the display system DS may comprise a visual effect contributed by the composite structure CS and/or a visual effect contributed by light from the light source LS. As indicated schematically in FIGS. 3A-3B, 4A-4B, 6 and 10A, the visual effect contributed by the composite structure may comprise a visual effect without light from the light source and/or a visual effect shown as image IM with light from the light source transmitted through the composite structure. See also FIGS. 12A-12D, 13 and 13A-13C. As indicated schematically in FIGS. 5A-5B, 7A-7B, 8, 11A-11B, 17A-17B, 18A-18B, 19A-19B and 22A-22B, the base layer BL of the composite structure CS of the display system DS for the component C may be configured to provide a visual effect comprising a light dispersion/scattering effect; the light dispersion/scattering effect may comprise reflection and/or refraction of light at the set of elements shown as projections PR. See FIGS. 3A-3B, 4A-4B, 6, 10A-10B, 12A-12D, 13, 13A-13C, 14, 15, 16, 23, 23A, 27, 28, 29 and 30. The composite visual effect of the composite structure may comprise a visual effect of the form/elements of the base layer BL and/or the form/visual object/pattern of the intermediate layer NL and/or the form/visual object/pattern of the cover layer TL. See FIGS. 5A-5B, 7A-7B, 8, 9, 11A-11B, 12A-12D, 17A-17B, 18A-18B, 19A-19B, 20A-20B, 21A-21B, 22A-22B, 23, 23A, 24, 25 and 26A-26B.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the light source LS of the display system DS may configured to provide a composite visual effect comprising a lighting effect visible at the cover layer TL of the composite structure CS; the lighting effect may comprise light visible at the cover layer and/or variation in a form of light transmission and/or variation of light across the composite structure and/or variation of color of light across the composite structure and/or variation of intensity of light across the composite structure and/or variation of pattern of light across the composite structure; and/or motion of light across the composite structure and/or flowing of light across the composite structure and/or sequencing of light across the composite structure and/or intermittence of light across the composite structure; the lighting effect may comprise at least one of intensity and/or color and/or pattern and/or imagery and/or variation of intensity and/or variation of color and/or variation of pattern and/or variation of imagery. See also FIGS. 17A-17B, 18A-18B, 19A-19B, 20A-20B and 21A-21B.

According to an exemplary embodiment as shown schematically in FIGS. 3A-3B, 4A-4B, 6, 10A-10B, 11A-11B, 12A-12D, 13, 13A-13C, 14, 15, 16, 23, 23A, 27, 28, 29 and 30, the light source LS may be operated by a control module LM (e.g. according to a control program, etc.); the light source LS may be configured to transmit light in a form configured to provide a dynamic visual effect; the form may comprise at least one of color and/or amplitude and/or intensity and/or frequency and/or segmentation and/or sequence and/or pattern and or imagery; the form may comprise a lighting effect. See also FIGS. 17A-17B, 18A-18B, 19A-19B, 20A-20B and 21A-21B.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the light source LS may be configured to provide light to the composite structure CS for the display system DS of the component C; the display system DS may comprise a light module LM; the light source LS may be operated by a control module/system LM configured to transmit light in a form configured to provide the dynamic visual effect. The form may comprise at least one of color and/or amplitude and/or intensity and/or frequency and/or segmentation and/or sequence and/or pattern and or imagery. The form may comprise variation of at least one of color and/or amplitude and/or intensity and/or frequency and/or segmentation and/or sequence and/or pattern and/or imagery. The form may comprise a lighting effect. The light source may comprise at least one of (a) an LED; (b) an LED array; (c) a set of LEDs; (d) a light display; (e) a side light; (f) a light guide; (g) a light diffuser; (h) a lamp; (i) a backlight; (j) a lamp head/bead; (k) a light strip. See FIGS. 11A-11B, 12A-12D, 14, 15, 16, 27, 28, 29 and 30.

According to an exemplary embodiment as shown schematically in FIGS. 5A-5B, 7A-7B, 8, 11A-11B, 17A-17B, 18A-18B, 19A-19B and 22A-22B, the set of elements of the surface of the base layer BL may comprise a set of projections PR comprising at least one of (a) polygonal structures and/or (b) triangular structures and/or (c) quadrangular structures and/or (d) a combination of polygonal structures. According to an exemplary embodiment as shown schematically in FIGS. 5A-5B, 7A-7B, 8, 11A-11B, 17A-17B, 18A-18B, 19A-19B and 22A-22B, the set of elements of the surface of the base layer BL may comprise a set of prismatic structures PR comprising at least one of (a) polygonal prismatic structures and/or (b) triangular prismatic structures and/or (c) quadrangular prismatic structures and/or (d) structures forming an uneven regular surface and/or (e) structures forming an irregular surface and/or (f) structures forming a prismatic surface and/or (g) structures configured to converge light from the light source and/or (h) structures configured to diverge light from the light source and/or (i) structures configured to disperse light from the light source and/or (j) cone-shaped structures and/or (k) angle-shaped structures and/or (l) ridge-shaped structures and/or (m) polyhedron/quadrahedron-shaped structures and/or (n) frusto-conical structures and/or (o) multi-sided cone structures and/or (p) concave structures and/or (q) convex structures and/or (r) combinations of various different shaped structures. See also FIGS. 23, 23A, 24, 25 and 26A-26B. As indicated schematically in FIGS. 17A-17B, 18A-18B and 19A-19B, elements/surface of the base layer BL shown as projections PR may be varied in form and/or combined into various arrangements to provide an intended visual effect for the display system DS. See also FIGS. 3A-3B, 4A-4B, 10A-10B, 12A-12D, 13 and 13A-13C.

According to an exemplary embodiment as shown schematically in FIGS. 5A-5B, 7A-7B, 8, 11A-11B, 14, 15, 16, 17A-17B, 18A-18B, 19A-19B and 22A-22B, the base layer BL of the composite structure CS of the display system DS for the component C may be configured to provide a visual effect comprising a light dispersion/scattering effect; the light dispersion/scattering effect may comprise reflection and/or refraction of light; the base layer BL may comprise a set of elements comprising projections shown as prismatic elements PR. See also FIGS. 17A-17B, 18A-18B, 19A-19B, 23, 23A, 24, 25 and 26A-26B. As indicated schematically in FIGS. 7A-7B, 22A-22B, 23, 23A, 24, 25 and 26A-26B, the prismatic elements PR of the base layer BL of the composite structure CS are configured to provide dispersed light LD comprising output light from input light to the composite structure comprising applied light LP from the light source LS. As indicated schematically in FIGS. 12A-12D, 14, 15, 16, 23, 23A and 26A, the output of dispersed light LD from the prismatic elements PR of the base layer BL into the composite structure CS may be configured to facilitate an enhanced visual effect for the composite visual effect of the display system DS. See also FIG. 24 and TABLE B. As indicated schematically in FIG. 23, applied light LP from the light source LS will be dispersed/scattered within the composite structure CS by the prismatic elements PR at the surface of the base layer BL; as shown representationally/schematically in FIGS. 23 and 23A, light that would without dispersion/scattering be transmitted directly substantially along line for light LX will with dispersion/scattering at the surface of base layer BL with prismatic elements PR be refracted/transmitted in a different direction indicated as along line for light LZ. Dispersion/scattering of light at the base layer BL within the composite structure CS may be intended to produce enhanced visual effects such as a depth effect, etc. for the composite visual effect of the display system.

According to an exemplary embodiment as shown schematically in FIGS. 5A-5B, 7A-7B, 8, 11A-11B, 17A-17B, 18A-18B, 19A-19B and 22A-22B, the base layer BL of the composite structure CS of the display system DS for the component C may be configured to provide a visual effect comprising a prismatic effect; variation in the prismatic effect may be provided by variation in the form/shape and/or the set of elements shown as projections PR at the surface of the base layer BL. See also FIGS. 23, 23A, 24, 25 and 26A-26B.

According to an exemplary embodiment as shown schematically in FIGS. 9, 11A-11B, 20A-20B and 21A-21B, the intermediate layer NL of the composite structure CS of the display system DS for the component C may be configured to provide a pattern PT and/or shading; the intermediate layer NL may comprise an imaging layer; the imaging layer may be configured to present a projection of light; the pattern and/or imaging layer may comprise a coating and/or a film; the imaging layer may comprise at least one of a color and/or a pattern and/or a texture and/or imagery; the pattern may comprise a printed pattern, film, etc. See also FIGS. 3A-3B, 4A-4B, 6, 10A-10B, 13 and 13A-13C.

According to an exemplary embodiment as shown schematically in FIGS. 3A-3B, 4A-4B, 7A-7B, 9, 10A-10B, 11A-11B, 20A-20B and 21A-21B, the intermediate layer NL may comprise a decorative layer; the decorative layer may comprise a pattern PT (e.g. color, shading, etc.); the decorative layer may be visible through the cover layer; the decorative layer may be configured to provide a visual effect comprising at least one of (a) a projection effect (b) a decorative effect and/or (c) a color effect and/or (d) a pattern effect and/or (e) a light dispersion effect and/or (f) a light dispersion effect from the base layer and/or (g) a prismatic effect from the base layer and/or (h) a lighting effect from the light source and/or (i) a lighting effect from transmission of light from the light source through the base layer and/or (j) a deadfront effect. See also FIG. 6.

According to an exemplary embodiment as shown schematically in FIGS. 5A-5B, 7A-7B, 9, 11A-11B, 20A-20B and 21A-21B, the intermediate layer NL of the composite structure CS of the display system DS for the component C may be configured to provide a visual effect comprising a color/pattern effect; variation in the color/pattern effect may be provided by variation in the form/shape and pattern PT of the intermediate layer NT. The pattern/form of intermediate layer NL within the composite structure CS may be intended to produce enhanced visual effects for the composite visual effect of the display system.

According to an exemplary embodiment as shown schematically in FIGS. 2, 7A-7B, 12A-12D, 23 and 23A, the cover layer TL of the composite structure CS of the display system DS for the component C may comprise a surface for the composite structure CS; the cover layer TL may comprise a light-transmissive material; the cover layer may comprise an element configured to present a visual object such as a pattern PX; the element may comprise an engraved element; the cover layer may comprise a coating and/or finish and/or film and/or decorative layer and/or protective layer; the cover layer TL may comprise at least one of a color and/or a pattern and/or texture and/or a shape and/or a thickness. See also 3A-3B, 4A-4B, 6, 10A-10B, 13, 13A-13C, 27, 28, 29 and 30.

According to an exemplary embodiment as shown schematically in FIGS. 5A-5B, 7A-7B and 11A-11B, the cover layer TL of the composite structure CS of the display system DS for the component C may be configured to provide a visual effect comprising a color/pattern/element effect; variation in the color/pattern effect may be provided by variation in the form/shape and element/pattern PX of the cover layer TL; the cover layer TL of the composite structure CS of the display system DS for the component C may be configured to provide a visual effect comprising surface effect (e.g. reflectance/gloss, transmittance, color, etc.); variation in the surface effect may be provided by variation in the surface of the cover layer TL. The pattern/form of cover layer TL within the composite structure CS may be intended to produce enhanced visual effects for the composite visual effect of the display system.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the composite visual effect of the composite structure CS of the display system DS for the component C may comprise a combined visual effect of (a) a light dispersion effect and/or (b) a prismatic effect from the base layer and/or (c) a projection effect from the intermediate layer and/or (d) a decorative effect from the intermediate layer and/or (e) a color effect from the intermediate layer and/or (f) a pattern effect from the intermediate layer and/or (g) a surface effect from the cover layer and/or (h) a depth effect from the cover layer and/or (i) a color effect from the cover layer and/or (j) a pattern effect from the cover layer and/or (k) a lighting effect from the light source and/or (1) a lighting effect from transmission of light from the light source through the base layer and/or (m) a lighting effect from transmission of light from the light source through the base layer and from the intermediate layer and/or (n) a day effect and/or (o) a night effect and/or (p) a stereoscopic effect and/or (q) a deadfront effect and/or (r) static visual effect from the light source and/or (s) dynamic visual effect from the light source and/or (t) and on/off backlit effect to illuminate and/or substantially conceal the interior of/pattern within the composite structure and/or (u) a variation of the viewing angle for a pattern/image within the composite structure and/or (v) a reflection at the surface of the cover layer of the composite structure.

As indicated schematically in FIGS. 3A-3B, 4A-4B, 6, 8, 9 and 10A-10B, the composite structure CS of the display system DS of the component C may be configured to provide a combined visual effect for the composite visual effect shown as image IM of light scattering/dispersion/transmission (e.g. reflection/refraction, absorption, transmission, etc.) from the light to/into the composite structure CS through the base layer BL (with form/color/shade/effect and projections/elements PR) and intermediate layer NL (with pattern/color/effect PT) and the cover layer TL (with pattern/color/form/effect PX). See also FIGS. 5A-5B, 7A-7B, 11A-11B, 12A-12D, 13, 13A-13D, 17A-17B, 18A-18B, 19A-19B, 20A-20B and 21A-21B and TABLE B (light including ambient light, applied light, dispersed/transmitted light, etc.).

As indicated schematically in FIGS. 12A-12D, the display system DS may be configured to provide a composite visual effect based on the construction of the composite structure CS when the light source LS is off, when illuminated from the exterior by ambient light LA from the vehicle interior and when illuminated by applied light LP from the light source LS; when illuminated by ambient light LA, the composite structure will provide a visual effect from reflected light LF; when illuminated by applied light LP, the composite structure will provide a visual effect from scattered/dispersed light LD. See also FIGS. 3A-3B, 4A-4B, 6 and 10A.

As indicated schematically in FIGS. 13 and 13A-13C, the display system DS may be configured to provide a composite visual effect based on the construction of the composite structure CS and form/lighting effect of the light source LS when illuminated by applied light LP from the light source LS; when illuminated by applied light LP, the composite structure will provide a visual effect from scattered/dispersed light LD according to the lighting effect from the light source LS; as indicated schematically, the effect may comprise a variation in motion, color, sequence, etc.

According to an exemplary embodiment indicated schematically in FIGS. 3A-3B, 4A-4B, 6, 10A-10B, 12A-12D, 13 and 13A-13C, when the light source is not emitting light into the composite structure the component may provide a visual effect such as comprising reflection of ambient light and/or a deadfront effect (e.g. no visible content/image or effect from the composite structure); when the light source is emitting light into the composite structure, the component may provide a visual effect comprising any of a variety of lighting effects as contributed by the composite structure and light source/module.

Exemplary Embodiments—A

According to an exemplary embodiment as shown schematically in FIGS. 2, 3A-3B, 4A-4B, 5A-5B, 6, 10A-10B, 11A-11B, 12A-12D, 13 and 13A-13C, a component C for a vehicle interior may comprise a display system DS comprising a light source LS configured to provide light and a composite structure CS comprising a base layer BL and an intermediate layer NL and a cover layer TL; the light source may be configured to transmit light into the composite structure; the base layer may comprise a surface comprising a set of elements shown as projections PR. See also FIGS. 7A-7B, 14, 15, 16, 23, 23A, 27, 28, 29 and 30.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the composite structure CS of the display system DS may be configured to present a composite visual effect shown as image IM at the cover layer TL. The composite visual effect may comprise (a) a visual effect contributed by the composite structure and/or (b) a visual effect contributed by light from the light source. The visual effect contributed by the composite structure may comprise (a) a visual effect without light from the light source and (b) a visual effect with light from the light source. The visual effect without light from the light source may comprise a visual effect from ambient light in the vehicle interior. The visual effect without light from the light source may comprise a visual effect from ambient light in the vehicle interior into the composite structure. The visual effect without light from the light source may comprise concealment of visibility into the composite structure. The visual effect without light from the light source may comprise concealment of the base layer of the composite structure. The visual effect with light from the light source may comprise a visual effect from light transmitted through the composite structure. The visual effect from light transmitted through the composite structure may comprise a dynamic visual effect.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the light source may be configured to provide a lighting effect. The lighting effect may be visible at the cover layer. The lighting effect may comprise light visible at the cover layer. The lighting effect may comprise variation in a form of light transmission. The lighting effect may comprise variation of light across the composite structure. The lighting effect may comprise variation of color of light across the composite structure. The lighting effect may comprise variation of intensity of light across the composite structure. The lighting effect and or dynamic visual effect may comprise variation of pattern of light across the composite structure. The lighting effect may comprise motion of light across the composite structure. The lighting effect may comprise flowing of light across the composite structure. The lighting effect may comprise sequencing of light across the composite structure. The lighting effect may comprise intermittence of light across the composite structure. The lighting effect may comprise at least one of intensity and/or color and/or pattern and/or imagery and/or variation of intensity and/or variation of color and/or variation of pattern and/or variation of imagery. The lighting effect may comprise a backlight for the composite structure. The lighting effect may comprise a tunnel effect for the composite structure.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the light source LS may be configured to provide light to the composite structure CS for the display system DS of the component C; the display system DS may comprise a light module LM; the light source LS may be operated by a control module/system LM configured to transmit light in a form configured to provide the dynamic visual effect. The form may comprise at least one of color and/or amplitude and/or intensity and/or frequency and/or segmentation and/or sequence and/or pattern and or imagery. The form may comprise variation of at least one of color and/or amplitude and/or intensity and/or frequency and/or segmentation and/or sequence and/or pattern and/or imagery. The form may comprise a lighting effect. The light source may comprise at least one of (a) an LED; (b) an LED array; (c) a set of LEDs; (d) a light display; (e) a side light; (f) a light guide; (g) a light diffuser; (h) a lamp; (i) a backlight; (j) a lamp head/bead.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the visual effect contributed by the composite structure may comprise (a) a visual effect contributed by the base layer and (b) a visual effect contributed by the intermediate layer. The visual effect contributed by the composite structure may comprise (a) a visual effect contributed by the base layer and (b) a visual effect contributed by the intermediate layer and a visual effect contributed by the cover layer.

According to an exemplary embodiment as shown schematically, the display system of the component may comprise a diffuser layer (a) between the light source and the base layer and/or (b) between the base layer and the intermediate layer. The intermediate layer may comprise a diffuser layer. The diffuser layer may be configured to diffuse light visible through the cover layer. The diffuser layer may be configured to enhance a viewing angle of light visible through the cover layer.

According to an exemplary embodiment as shown schematically in FIGS. 5A-5B, 7A-7B, 8, 11A-11B, 17A-17B, 18A-18B, 19A-19B and 22A-22B, the base layer BL may be configured to transmit light from the light source; the base layer may comprise a set of elements shown as projections PR. See also FIGS. 22A-22B, 23, 23A, 24, 25 and 26A-26B. The base layer may comprise a light-transmissive material. The base layer may be configured to provide dispersion of light transmitted from the light source. The set of elements shown as projections PR of the surface of the base layer may be configured to provide dispersion of light transmitted from the light source. The base layer may be configured to provide reflection of light transmitted from the light source. The set of elements of the surface of the base layer may be configured to provide reflection of light transmitted from the light source. The base layer may be configured to provide refraction of light transmitted from the light source. The set of elements of the surface of the base layer may be configured to provide refraction of light transmitted from the light source. The base layer may be configured to transmit light from the light source into the intermediate layer. The base layer may comprise a lens layer. The surface of the base layer may comprise an emergent surface. The base layer may comprise an incident surface. The surface of the base layer may comprise a curved surface and/or a prismatic surface. The emergent surface of the base layer may comprise a prismatic surface. The surface of the base layer may comprise a curved surface and/or a prismatic surface. The surface of the base layer may comprise a prismatic surface. The base layer may comprise a lens layer comprising an incident surface and/or an emergent surface configured as a curved surface and/or a prismatic surface. The set of elements of the surface of the base layer may comprise a set of projections. The set of elements of the surface of the base layer may comprise a variation of the set of projections. The set of projections may comprise at least one of a set of prismatic structures. The set of prismatic structures may comprise at least one of (a) polygonal structures and/or (b) triangular structures and/or (c) quadrangular prismatic structures. The set of prismatic structures may comprise at least one of (a) structures forming an uneven regular surface and/or (b) structures forming an irregular prismatic surface and/or (c) structures configured to converge light from the light source and/or (d) structures configured to diverge the light from the light source. The set of elements of the surface of the base layer may comprise a set of prismatic elements. The set of elements of the surface of the base layer may comprise a variation of the set of prismatic elements. The base layer may be configured to provide a visual effect comprising a light dispersion effect. The light dispersion effect may comprise reflection and/or refraction of light. The light dispersion effect may comprise reflection. The light dispersion effect may comprise refraction. The light dispersion effect may comprise reflection and refraction of light from the light source. The visual effect may comprise a crystal effect. The base layer may be configured to provide a visual effect comprising a prismatic effect. The prismatic effect may be provided by the set of elements of the surface of the base layer.

According to an exemplary embodiment as shown schematically in FIGS. 9, 11A-11B, 20A-20B and 21A-21B, the intermediate layer NL may be configured to transmit light from the base layer BL; the intermediate layer may comprise a form/shape and a visual object shown as pattern PT. The intermediate layer may comprise a light-transmissive material. The intermediate layer may be configured to provide projection of light transmitted from the base layer. The intermediate layer may be configured to transmit light from the base layer into the cover layer. The intermediate layer may be configured to provide an imaging layer. The imaging layer may be configured to present a projection of light. The imaging layer may comprise a coating. The imaging layer may comprise a film. The imaging layer may comprise at least one of a color and/or a pattern and/or a texture and/or imagery. The pattern may comprise a texture. The imaging layer may comprise a pattern layer. The pattern layer may comprise a texture. The imaging layer may comprise a decorative layer. The imaging layer may be visible through the cover layer. The intermediate layer may be configured to present a projection of light transmitted through the base layer. The intermediate layer may comprise a surface configured for presentation of projected light. The intermediate layer may comprise a surface configured for presentation of an image. The intermediate layer may comprise at least one of a color and/or a pattern and/or texture. The pattern may comprise a texture. The intermediate layer may comprise a variation of at least one of color and/or pattern. The intermediate layer may comprise a decorative layer. The decorative layer may be visible through the cover layer. The intermediate layer may be configured to provide a visual effect comprising at least one of (a) a projection effect (b) a decorative effect and/or (c) a color effect and/or (d) a pattern effect and/or (e) a light dispersion effect from the base layer and/or (f) a prismatic effect from the base layer and/or (g) a lighting effect from the light source and/or (h) a lighting effect from transmission of light from the light source through the base layer. A lighting effect from transmission of light from the light source through the base layer may comprise projection of light within the intermediate layer. The projection effect may comprise a two-dimensional effect and/or three-dimensional effect.

According to an exemplary embodiment as shown schematically in FIGS. 2, 7A-7B, 12A-12D, 23 and 23A, the cover layer may comprise a surface for the composite structure; the cover layer TL may comprise a shape/form and a visual object such as pattern PX. See also 3A-3B, 4A-4B, 6, 10A-10B, 13, 13A-13C. The cover layer may comprise a light-transmissive material. The cover layer may comprise at least one of a color and/or a pattern and/or texture and/or a shape and/or a thickness. The pattern may comprise a texture. The cover layer may comprise a variation of at least one of color and/or pattern and/or shape and/or thickness. The cover layer may comprise a prism shape. The cover layer may be configured to provide a visual effect. The visual effect may be visible at a viewing angle at the surface of the cover layer. The visual effect may comprise a surface effect. The surface effect may comprise at least one of (a) a decorative effect and/or (b) reflection of light and/or (c) transmission of light and/or (d) transparency and/or (e) semi-transparency and/or (f) gloss and/or (g) light from the light source and/or (h) a vanish effect for the base layer and/or (i) an element configured to present a visual effect. The cover layer may comprise an element configured to present the visual effect. The visual effect may comprise a depth effect. The element of the cover layer may comprise an image. The element of the cover layer may comprise an engraved image. The cover layer may comprise at least one of a color and/or a pattern and/or imagery. Imagery may comprise an image formed as the element of the cover layer. The element configured to present the visual effect of the cover layer may be within the cover layer. The element configured to present the visual effect of the cover layer may be visible at a viewing angle at a surface of the cover layer. The surface effect may comprise at least one of reflection of ambient light within the vehicle interior. The cover layer may comprise a coating. The cover layer may be configured to reflect ambient light within the vehicle interior. The cover layer may be configured to provide a visual effect comprising at least one of (a) a surface effect; (b) a depth effect and/or (c) a color effect and/or (d) a pattern effect and/or (e) a light dispersion effect from the base layer and/or (f) a prismatic effect from the base layer and/or (g) a projection effect from the intermediate layer and/or (h) a decorative effect from the intermediate layer and/or (i) a color effect from the intermediate layer and/or (j) a pattern effect from the intermediate layer and/or (k) a lighting effect from the light source and/or (l) a lighting effect from transmission of light from the light source through the base layer and/or (m) a lighting effect from transmission of light from the light source through the base layer and from the intermediate layer.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the composite visual effect may comprise a combined visual effect of (a) visual effect of the base layer and/or (b) visual effect of the intermediate layer and/or (c) visual effect of the cover layer. The composite visual effect may comprise a combined visual effect of (a) visual effect of the base layer and/or (b) visual effect of the intermediate layer and/or (c) visual effect of the cover layer and/or (d) visual effect of light from the light source and/or (e) visual effect of ambient light in the vehicle interior.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the composite visual effect of the composite structure CS of the display system DS for the component C may comprise a combined visual effect of (a) a light dispersion effect and/or (b) a prismatic effect from the base layer and/or (c) a projection effect from the intermediate layer and/or (d) a decorative effect from the intermediate layer and/or (e) a color effect from the intermediate layer and/or (f) a pattern effect from the intermediate layer and/or (g) a surface effect from the cover layer and/or (h) a depth effect from the cover layer and/or (i) a color effect from the cover layer and/or (j) a pattern effect from the cover layer and/or (k) a lighting effect from the light source and/or (l) a lighting effect from transmission of light from the light source through the base layer and/or (m) a lighting effect from transmission of light from the light source through the base layer and from the intermediate layer and/or (n) a day effect and/or (o) a night effect and/or (p) a stereoscopic effect. The day effect may comprise reflection of ambient light in the vehicle interior. The night effect may comprise light from the light source. The stereoscopic effect may comprise a multi-level visual effect within the composite structure. The stereoscopic effect may comprise a depth effect within the composite structure. The stereoscopic effect may comprise an element within the composite structure.

According to an exemplary embodiment as shown schematically, the intermediate layer may comprise a translucent material; the translucent material may be configured so that the base layer is not visible at the cover layer. The intermediate layer may comprise a flat surface and/or a prismatic surface to enable the projection on an imaging layer to present a two-dimensional effect and/or three-dimensional effect. The base layer comprising the surface may comprise a lens layer comprising a prismatic surface; the prismatic surface of the lens layer may comprise the set of elements of the surface of the base layer projecting at an acute angle. The intermediate layer may comprise at least one of materials of polycarbonate, acrylic, acrylonitrile-butadiene-styrene, nylon, polypropylene, polyurethane, metal, printing ink, wood, and fabric. The cover layer may comprise at least one of materials of polycarbonate, acrylic, acrylonitrile-butadiene-styrene, nylon, polypropylene, polyurethane, metal, printing ink, wood, fabric, epoxy resin, and UV paint. The intermediate layer and the cover layer may be (a) separated by a gap and/or (b) bonded by an optical adhesive.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, a component C/10 shown as display system DS for a vehicle interior may comprise a light source LS shown as a light-emitting unit; a base layer BL shown as a lens layer comprising an incident surface and/or an emergent surface configured as a curved surface and/or a prismatic surface; an intermediate layer NL shown as comprising an imaging layer configured to receive light emitted by the light-emitting unit and projected on the imaging layer through the lens layer to form a projection; and a cover layer TL. The projection on the imaging layer may be rendered visible through the cover layer. The imaging layer may comprise a translucent material; the translucent material may be configured so that the lens layer is not visible. The imaging layer may comprise a surface configured to enable the projection on the imaging layer to present a multi-dimensional effect.

According to an exemplary embodiment shown schematically in FIGS. 22A-22B and 26A-26B, the base layer BL shown as lens layer may comprise a prismatic surface comprising prismatic elements shown as projections PR; the prismatic elements may be configured at an acute angle and with an R value between 0.01 and 0.09 mm. See also FIGS. 23, 23A, 24 and 25. According to an exemplary embodiment as indicated in FIGS. 22A-22B and 26A-26B, variations in the R value will produce variations in the light dispersion/scattering effect and projection/transmission of light through the composite structure as to produce variation in the visual effect at the surface of the cover layer of the composite structure.

According to an exemplary embodiment shown schematically, the light-emitting unit may be configured to provide at least one dynamic effect comprising a segmented light effect and/or an active light effect and/or and an intermittent light-dark effect. The cover layer and/or the imaging layer may be configured to provide at least one of a pattern and/or a texture and/or a color. The component may comprise a light-diffusing layer (1) between the light-emitting unit and the lens layer or (2) between the lens layer and the imaging layer.

According to an exemplary embodiment as shown schematically in the FIGURES, a component for a vehicle interior may comprise a light-emitting unit; a lens layer comprising an incident surface and/or an emergent surface configured as a curved surface and/or a prismatic surface; an imaging layer configured to receive light emitted by the light-emitting unit and projected on the imaging layer through the lens layer to form a projection; and a cover layer. The projection on the imaging layer may be rendered visible through the cover layer. The imaging layer may comprise a translucent material; the translucent material may be configured so that the lens layer is not visible. The imaging layer may comprise a flat surface and/or a prismatic surface to enable the projection on the imaging layer to present a two-dimensional effect and/or three-dimensional effect. The lens layer may comprise the prismatic surface; the prismatic surface of the lens layer may comprise an acute angle; the acute angle may comprise an R value between 0.01 to 0.09 mm. The imaging layer may be formed by paint spraying or by physical vapor deposition plating. The imaging layer may comprise at least one of materials of polycarbonate, acrylic, acrylonitrile-butadiene-styrene, nylon, polypropylene, polyurethane, metal, printing ink, wood, and fabric. The light-emitting unit may be configured to provide monochromatic light or polychromatic light. The light-emitting unit may be configured to provide at least one dynamic effect comprising a segmented-sequenced/running light effect and/or a pulsing/breathing light effect and/or an intermittent light-dark effect. The cover layer may comprise at least one of materials of polycarbonate, acrylic, acrylonitrile-butadiene-styrene, nylon, polypropylene, polyurethane, metal, printing ink, wood, fabric, epoxy resin, and UV paint. The cover layer may comprise a thickness of 0.5 to 50 mm and/or a thickness preferably of 1 to 15 mm. The cover layer may comprise (a) a protective material comprising (1) a thickness of 0.05 to 5 mm and/or (2) a thickness of 0.1 to 2 mm and (3) a hardness of 1H or above; or (b) a protective material comprising (1) a thickness of 0.05 to 5 mm and/or (2) a thickness of 0.1 to 2 mm and (3) with weather resistance, stain resistance, chemical resistance or scratch resistance. The cover layer and/or the imaging layer may be configured to provide any one or more of a pattern and/or a texture and/or a color. The component may comprise a light-homogenizing layer (1) between the light-emitting unit and the lens layer or (2) between the lens layer and the imaging layer. The imaging layer and the cover layer may be separated by a gap and/or the imaging layer and the cover layer may be bonded by an optical adhesive. The imaging layer and the lens layer may be separated by a gap and/or the imaging layer and the lens layer may be parallel and/or the imaging layer and lens layer may be at an angle. The imaging layer may comprise a translucent material; the translucent material may be configured so that the lens layer is not visible. The imaging layer may comprise a surface configured to enable the projection on the imaging layer to present a multi-dimensional effect. The lens layer may comprise the prismatic surface comprising prismatic elements at an acute angle; the prismatic elements may be configured with an R value between 0.01-0.09 mm. See FIGS. 22A-22B and 26A-26B. The light-emitting unit may be configured to provide at least one dynamic effect comprising a segmented light effect and/or an active light effect and/or and an intermittent light-dark effect. The cover layer and/or the imaging layer may be configured to provide at least one of a pattern and/or a texture and/or a color. The component may comprise a light-diffusing layer (1) between the light-emitting unit and the lens layer or (2) between the lens layer and the imaging layer.

Exemplary Embodiments—B

Referring to FIGS. 1. 2, 27, 28, 29 and 30, a vehicle interior trim/component shown as a display system DS/10 may be provided for a vehicle interior I in such form as an instrument panel/dashboard IP, a door panel D and in a region at a center console FC of the vehicle V. See also FIGS. 3A-3B, 4A-4B, 5A-5B, 6, 10A-10B, 11A-11B, 12A-12D, 13 and 13A-13C. As indicated schematically in the FIGURES, the component 10 has a light source LS/1 providing a light-emitting function after the power is on; the component operates as conventional vehicle interior trim when the power is off (when the light is not emitted from the light source); the component may be configured to operate with a dynamic light display effect when the power is on (when the light source 1 emits light); the component may be configured to provide a visual effect intended to display enhanced use of technology and an enhanced sense of luxury in the vehicle interior. See FIGS. 3A-3B, 4A-4B, 6, 10A-10B, 12A-12D, 13, 13A-13C, 14, 15, 16, 23, 23A, 27, 28, 29 and 30.

According to an exemplary embodiment as shown schematically in FIGS. 27, 28, 29 and 30, the component C with display system DS/10 may comprise a light source shown as light-emitting unit 1, a base layer shown as lens layer 2, an intermediate layer shown as imaging layer 3, and a cover layer 4. The light-emitting unit 1 emits light when the power is on. The lens layer 2 contains an incident surface 21 and an emergent surface 22 along the propagation direction of the light, the incident surface 21 and/or the emergent surface 22 being configured as a curved surface and/or a prismatic surface to enable the light to undergo multiple refractions and reflections when passing through the lens layer 2. The imaging layer 3 may be configured to receive light emitted by the light-emitting unit 1, the light being projected on the imaging layer 3 through the lens layer 2 to form a projection. The cover layer 4 renders the projection on the imaging layer 3 visible through the cover layer 4. As indicated schematically according to an exemplary embodiment, the cover layer 4 may be on the imaging layer 3; when the component C with display system DS/10 is installed in the vehicle interior, the occupant in the cockpit may not directly see the projection formed on the imaging layer 3, but may indirectly see the projection formed on the imaging layer 3 through the cover layer 4; the exterior surface of the cover layer 4 may form the exterior surface of the component C with display system DS/10 that can be touched by the occupant in the cockpit. As indicated schematically, by providing the cover layer 4, the occupant in the cockpit may observe a projection on the imaging layer 3 having a certain depth forming a depth perception, i.e., a stereoscopic perception or a distance perception, of the projection.

Figure 27:
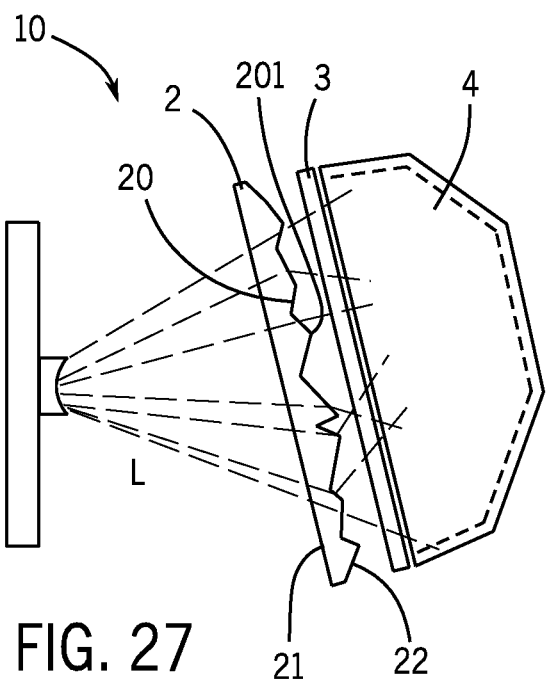
FIG. 27 is a schematic section view of operation of a composite structure of a component shown as comprising a display system according to an exemplary embodiment.

According to an exemplary embodiment as shown schematically in FIG. 27, the incident surface 21 of the lens layer 2 may comprise a flat surface; the emergent surface 22 may comprise a prismatic surface. The prismatic surface may be formed by a plurality of prismatic structures 20, including triangular prismatic structures, quadrangular prismatic structures, and/or polygonal prismatic structures, each prismatic structure forming an uneven regular and/or irregular prismatic surface, which acts to converge and/or diverge the light incident thereon. As indicated schematically according to an exemplary embodiment, the prismatic structure has an acute angle 201, the acute angle being an R angle, which may have an R value set to be 0.01-0.09 mm; the angles of the prismatic structures may have the same and/or different values. See also FIGS. 17A-17B, 18A-18B, 19A-19B, 22A-22B, 23, 23A, 24, 25 and 26A-26B.

According to an exemplary embodiment, the imaging layer 3 may be formed by paint spraying or by physical vapor deposition (PVD) plating. The imaging layer 3 may be only a projection film formed by a paint spraying or PVD plating process, and at this time, the light emitted by the light-emitting unit 1 may arrive at the projection film through the lens layer 2 and may be imaged on the projection film, finally forming a projection. As indicated schematically according to an exemplary embodiment, the imaging layer 3 contains at least one of materials of polycarbonate (PC), acrylic (PMMA), acrylonitrile-butadiene-styrene (ABS), nylon (PA), polypropylene (PP), polyurethane (PU), metal, printing ink, wood, and fabric, at least one of these materials being transparent or translucent.

As indicated schematically, the imaging layer 3 contains a translucent material; the lens layer 2 may be located between the imaging layer 3 and the light source. As indicated schematically, the imaging layer 3 comprising the translucent material may be provided to mask the lens layer 2.

The light emitted by the light-emitting unit 1 forms a projection on the imaging layer 3 when arriving at it. In order to create a projection effect, the imaging layer 3 optionally contains flat and/or prismatic surfaces to enable the projection on the imaging layer 3 to present a two-dimensional and/or three-dimensional effect. As indicated schematically, the light-emitting unit 1 may be configured to provide monochromatic or polychromatic light. As indicated schematically according to an exemplary embodiment, the light-emitting unit 1 includes at least one lamp head/bead (e.g., LED), and the monochromatic or polychromatic light may be implemented by one lamp head/bead or a plurality of lamp head/beads. In addition to changing the color of light emitted by the light-emitting unit 1, the light-emitting frequency of the light-emitting unit 1 can be changed. When there is a plurality of lamp head/beads, the light-emitting sequence of the plurality of lamp head/beads can be changed, so that the light-emitting unit 1 is configured to provide at least one of dynamic effects of a running light effect, a breathing light effect, and an intermittent light-dark effect, thereby enabling the projection on the imaging layer 3 to present a colorful, static and/or dynamic two-dimensional and/or three-dimensional effect.

The two-dimensional and/or three-dimensional effect presented by the projection on the imaging layer 3 may be completely formed by enabling the light emitted by the light-emitting unit 1 to pass through the lens layer 2 to the imaging layer 3. The two-dimensional and/or three-dimensional effect may not be visible when the light-emitting unit 1 does not emit light. Depending on the prismatic structures of the lens layer 2, the effects of light refraction and/or reflection through the lens layer 2 may be different. The lens layer 2 may be structurally designed according to the projection effect to be presented by the imaging layer 3. According to an exemplary embodiment, the lens layer 2 may include a plurality of lens layers stacked together along the propagation direction of the light, so that the effects of light refraction and/or reflection through the lens layers comprise variations/enhancements to provide an intended aesthetic appearance.

For the cover layer 4, it may contain the same or different material as the imaging layer. As indicated schematically according to an exemplary embodiment, the cover layer contains at least one of materials of polycarbonate (PC), acrylic (PMMA), acrylonitrile-butadiene-styrene (ABS), nylon (PA), polypropylene (PP), polyurethane (PU), metal, printing ink, wood, fabric, epoxy resin, and UV paint. In order to enable the occupant in the cockpit to observe a projection having a certain depth, a cover layer having a thickness set to be 0.5-50 mm, preferably 1-15 mm, may be provided. As indicated schematically, the cover layer 4 has a decorative function.

As indicated schematically, for the cover layer having a decorative function, in order to enable the cover layer 4 to meet the requirements of the vehicle for the surface performance of the interior trim, on the basis of cover layer having the thickness set to be 0.5-50 mm, preferably 1-15 mm, the cover layer 4 may further contain a protective material set to a certain thickness. As indicated schematically according to an exemplary embodiment, the cover layer 4 further contains a protective material (such as polycarbonate, acrylic, nylon or polypropylene) having a thickness of 0.05-5 mm, preferably 0.1-2 mm, and a hardness level of 1H or above, or the cover layer 4 further contains at least one of protective materials (such as thermosetting polyurethane, epoxy resin or UV paint) having a thickness of 0.05-5 mm, preferably 0.1-2 mm, and with weather resistance, stain resistance, chemical resistance or scratch resistance. When the cover layer 4 contains protective materials, the occupant in the cockpit will not be likely to perceive a difference between the cover layer 4 of the component 10 and the cover of other conventional vehicle interior trims at the touch of the cover layer 4.

According to an exemplary embodiment, the cover layer 4 and/or the imaging layer 3 may be configured to provide any one or more of patterns, textures, and colors such as a monochromatic line pattern or a gradient line pattern. As indicated schematically, an occupant in the cockpit may also observe specific patterns and/or textures and/or colors in an abstract light projection such as flowing streamers with multiple colors mixed. See also FIGS. 11A-11B, 12A-12D, 13 and 13A-13C.

Figure 28:
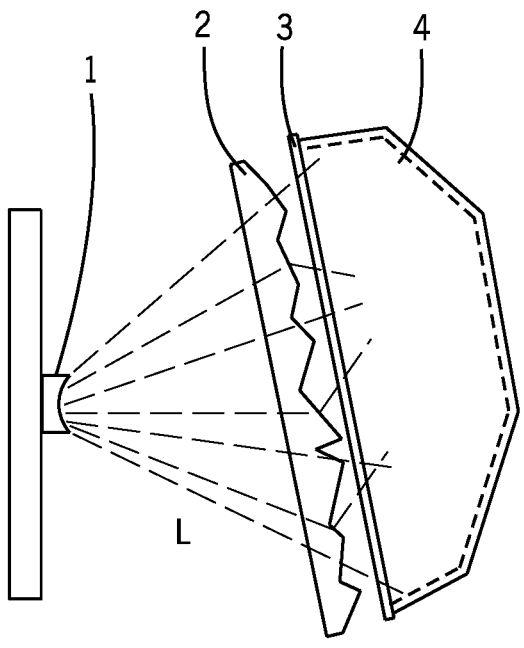
FIG. 28 is a schematic section view of operation of a composite structure of a component shown as comprising a display system according to an exemplary embodiment.
Figure 29:
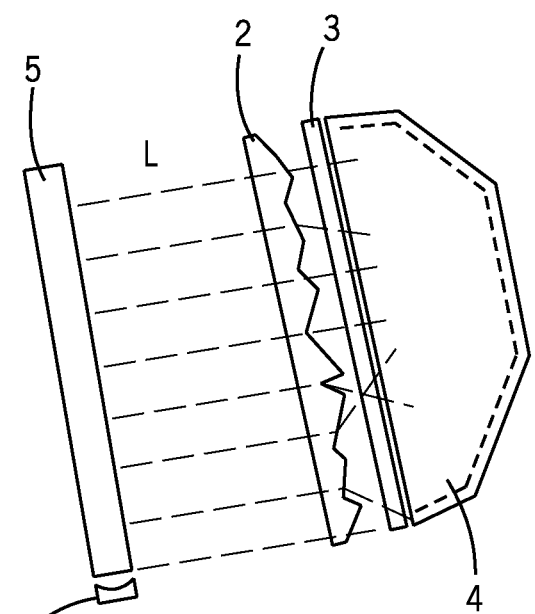
FIG. 29 is a schematic section view of operation of a composite structure of a component shown as comprising a display system according to an exemplary embodiment.

As shown schematically in FIG. 27, the imaging layer 3 and the cover layer 4 may be arranged at an interval, or as shown schematically in FIG. 28, the imaging layer 3 and the cover layer 4 may be bonded by means of an optical adhesive. As indicated schematically, in the configuration shown in FIG. 28, when the cover layer 4 is the same material as the imaging layer 3, the cover layer 4 having a certain thickness may be equivalent to a thickening of the thickness of the imaging layer 3. As indicated schematically, the distance between the imaging layer 3 and the cover layer 4 may optionally be 0-100 mm whether the imaging layer 3 and the cover layer 4 are disposed at an interval or in a bonding manner.

As shown schematically in FIGS. 27 and 28, the imaging layer 3 and the lens layer 2 may be disposed at an interval, and the imaging layer 3 and the lens layer 2 may be arranged parallel to each other. According to an exemplary embodiment, the imaging layer 3 and the lens layer 2 may be arranged at an angle to each other.

As indicated schematically, the distances and/or angles of the lens layer 2, the imaging layer 3, and the cover layer 4 to one another can be adjusted according to the size of the space occupied by the entire component C with display system DS/10 and the desired light display effect. As indicated schematically, the distances and/or angles of the light-emitting unit 1, the lens layer 2, the imaging layer 3, and the cover layer 4 to one another may be adjusted.

Figure 30:
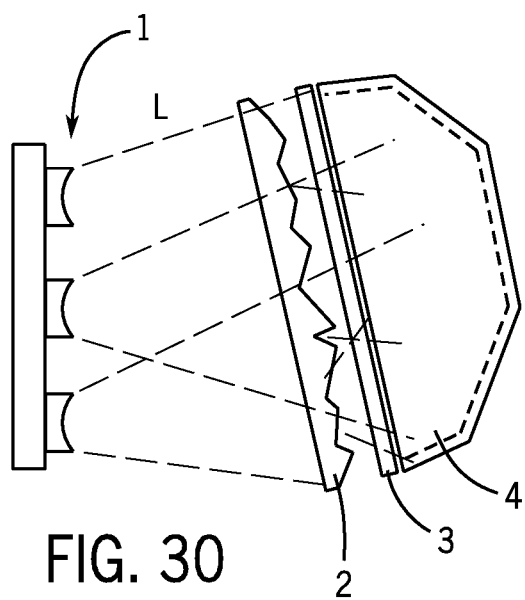
FIG. 30 is a schematic section view of operation of a composite structure of a component shown as comprising a display system according to an exemplary embodiment.

As shown schematically in FIG. 30, the vehicle interior trim further includes a light guide/diffuser shown as light-homogenizing layer 5, the light-homogenizing layer 5 being disposed between the light-emitting unit 1 and the lens layer 2. As shown schematically in FIGS. 27, 28 and 29, the light-emitting unit 1 exemplarily includes one lamp head/bead (e.g. light element, bulb, etc.), and as shown schematically in FIG. 30, the light-emitting unit 1 exemplarily includes three lamp heads/beads. When the light-homogenizing layer 5 is not provided, the light emitted by the three lamp head/beads distributed at intervals may be more homogenous than that emitted by one lamp head/bead, while by providing the light-homogenizing layer 5, the light can be homogenized even by using only one lamp head/bead under the scattering effect of the light-homogenizing layer 5 on the light.

According to an exemplary embodiment, a light guide/light-homogenizing layer may be provided between the lens layer 2 and the imaging layer 3.

According to an exemplary embodiment indicated schematically in FIGS. 3A-3B, 4A-4B, 6, 10A-10B, 12A-12D, 13 and 13A-13C, when the light-emitting unit/light source is not emitting light the component may provide a visual effect such as comprising reflection of ambient light; when the light-emitting unit/light source is emitting light, the component may provide a visual effect comprising any of a variety of lighting effects as contributed by the composite structure and light source/module.

Exemplary Embodiments—C

According to an exemplary embodiment, a component/trim for a vehicle interior may be configured to provide a light-emitting function to present a visual effect/composite visual effect; the component may comprise a display system comprising a light-emitting unit and a lens layer comprising an incident surface and/or an emergent surface configured as a curved surface and/or a prismatic surface and an imaging layer configured to receive light emitted by the light-emitting unit (from which light is projected on the imaging layer through the lens layer to form a projection) and a cover layer. See FIGS. 2, 3A-3B, 4A-4B, 5A-5B, 6, 10A-10B, 11A-11B, 12A-12D, 13 and 13A-13C. The projection on the imaging layer may be rendered visible through the cover layer. See FIGS. 3A-3B, 4A-4B and 6.

According to an exemplary embodiment as shown schematically in FIGS. 8, 11A-11B, 17A-17B, 18A-18B, 19A-19B, 22A-22B and 26A-26B, the base layer BL shown as lens layer may comprise a prismatic surface comprising prismatic elements shown as projections PR; the prismatic elements may be configured at an acute angle and with an R value between 0.01 and 0.09 mm. See also FIGS. 23, 23A, 24 and 25.

According to an exemplary embodiment, the intermediate layer NL shown as imaging layer may comprise a translucent material to render the lens layer invisible; the imaging layer may comprise a flat surface and/or a prismatic surface to enable the projection on the imaging layer to present a two-dimensional and/or three-dimensional effect. See also FIGS. 11A-11B, 12A-12D, 27, 28, 29 and 30. According to an exemplary embodiment, the imaging layer may be formed by paint spraying or by physical vapor deposition plating. According to an exemplary embodiment, the imaging layer may comprise at least one of polycarbonate material, acrylic material, acrylonitrile-butadiene-styrene material, nylon material, polypropylene material, polyurethane material, metal material, printing ink, wood material, and/or fabric material.

According to an exemplary embodiment, the light-emitting unit may be configured to provide monochromatic or polychromatic light. According to an exemplary embodiment, the light-emitting unit may be configured to provide at least one of a dynamic effect, a segmented-sequenced/running light effect, a pulsing/breathing light effect, and/or an intermittent light-dark effect.

According to an exemplary embodiment, the cover layer TL may comprise at least one of polycarbonate material, acrylic material, acrylonitrile-butadiene-styrene material, nylon material, polypropylene material, polyurethane material, metal material, printing ink, wood material, fabric material, epoxy resin material, and UV paint. According to an exemplary embodiment, the cover layer may comprise a thickness of 0.5-50 mm, preferably 1-15 mm; the cover layer may comprise a protective material having a thickness of 0.05-5 mm, preferably 0.1-2 mm, and a hardness of 1H or greater; the cover layer may comprise at least one of protective materials having a thickness of 0.05-5 mm (preferably 0.1-2 mm), and with weather resistance, stain resistance, chemical resistance or scratch resistance.

According to an exemplary embodiment, the cover layer and/or the imaging layer may be configured to provide any one or more of patterns, textures, and colors. See FIGS. 5A-5B, 7A-7B, 11A-11B, 20A-20B and 21A-21B.

According to an exemplary embodiment, the component may comprise a light guide/light-homogenizing layer between the light-emitting unit and the lens layer or between the lens layer and the imaging layer.

According to an exemplary embodiment, the imaging layer and the cover layer may be disposed at an interval, or the imaging layer and the cover layer may be bonded by means of an optical adhesive; the imaging layer and the lens layer may be arranged parallel to each other or at an angle.

According to an exemplary embodiment, the component may comprise a display system configured to provide a composite visual effect comprising lighting effects such as enhanced aesthetic and multi-level light display effects for the vehicle interior, including complex stereoscopic light display effects intended to enhance the sense of luxury and technology in the vehicle interior; when the light-emitting unit of the component does not emit light, the component may be configured to appear as conventional interior component/trim; when the light-emitting unit emits light, the component may be configured to provide light display effects.

According to an exemplary embodiment, a component for a vehicle interior may comprise a light-emitting unit, a lens layer comprising an incident surface and/or an emergent surface configured as a curved surface and/or a prismatic surface; an imaging layer configured to receive light emitted by the light-emitting unit, and a cover layer. Light projected on the imaging layer through the lens layer may form a projection. The projection on the imaging layer may be rendered visible through the cover layer. The imaging layer may comprise a translucent material to render the lens layer invisible. The imaging layer may comprise a flat surface and/or a prismatic surface to enable the projection on the imaging layer to present a two-dimensional and/or three-dimensional effect. The prismatic surface of the lens layer may comprise a acute angle, the acute angle being an R angle having an R value set to be 0.01-0.09 mm. The imaging layer may be formed by paint spraying or by physical vapor deposition plating. The imaging layer may comprise at least one of materials of polycarbonate, acrylic, acrylonitrile-butadiene-styrene, nylon, polypropylene, polyurethane, metal, printing ink, wood, and fabric. The light-emitting unit may be configured to provide monochromatic or polychromatic light. The light-emitting unit may be configured to provide at least one of dynamic effects of a running light effect, a breathing light effect, and an intermittent light-dark effect. The cover layer may comprise at least one of materials of polycarbonate, acrylic, acrylonitrile-butadiene-styrene, nylon, polypropylene, polyurethane, metal, printing ink, wood, fabric, epoxy resin, and UV paint. The cover layer may comprise a thickness of 0.5-50 mm, preferably 1-15 mm. The cover layer may comprise a protective material having a thickness of 0.05-5 mm, preferably 0.1-2 mm, and a hardness of 1H or above, or may comprise at least one of protective materials having a thickness of 0.05-5 mm, preferably 0.1-2 mm, and with weather resistance, stain resistance, chemical resistance or scratch resistance. The cover layer and/or the imaging layer may be configured to provide any one or more of patterns, textures, and colors. The component may comprise a light-homogenizing layer disposed between the light-emitting unit and the lens layer or between the lens layer and the imaging layer. The imaging layer and the cover layer may be disposed at an interval. The imaging layer and the cover layer may be bonded by means of an optical adhesive. The imaging layer and the lens layer may be disposed at an interval. The imaging layer and the lens layer may be arranged in parallel or at an angle.

Exemplary Embodiments—D

According to an exemplary embodiment as shown schematically in FIGURES, a vehicle interior component/trim may comprise a display system with a light-emitting function configured with a light source operated by a control module/system; the display system may be configured for operation in an intelligent/connected vehicle to provide operation in an intelligent mobile cockpit as coming into favor with and expected by consumers in the automotive market; the display system may be integrated to operate in a manner to achieve unique advantages of lighting technology in environment/atmosphere creation, human-computer interaction, and occupant experience; the display system may be configured to integrate technology and lighting.

According to an exemplary embodiment as shown schematically in FIGURES, the display system provides improvements over systems that use traditional lighting decoration solutions, which are limited by materials and lighting technology; the display system provides improvements in decoration, sense of luxury, and perception of technology, including improvements using lighting effects and functions to improve user experience as to better meet the growing needs of end-users for a better life.

According to an exemplary embodiment as shown schematically in FIGS. 2, 3A-3B, 4A-4B, 5A-5B, 6, 10A-10B, 11A-11B, 12A-12D, 13 and 13A-13C, the component C with display system DS/10 may comprise a light-emitting unit and a lens layer comprising an incident surface and/or an emergent surface configured as a curved surface and/or a prismatic surface and an imaging layer configured to receive the light emitted by the light-emitting unit (projected on the imaging layer through the lens layer to form a projection) and a cover layer. The projection on the imaging layer may be rendered visible through the cover layer. The component may be configured to provide a composite visual effect to provide enhanced aesthetic and multi-level light display effects such as complex stereoscopic light display effects as intended to enhance a sense of luxury and technology in the vehicle interior.

According to an exemplary embodiment as shown schematically in FIGS. 2, 3A-3B, 4A-4B, 5A-5B, 6, 10A-10B, 11A-11B, 12A-12D, 13 and 13A-13C, a component C for a vehicle interior may comprise a display system DS comprising a light source LS/LM and a composite structure CS comprising a base layer BL and an intermediate layer NL and a cover layer TL. The light source LS may comprise a control module LM and a lamp such as an LED array and/or light guide LG (e.g. as/with a diffuser) configured transmit light into the composite structure CL; the base layer BL may comprise a surface comprising a set of elements such as projections PR; the intermediate layer NL may comprise a visual object such as a pattern PT; the cover layer TL may comprise a visual object such as a pattern PX. The composite structure may present a composite visual effect at the cover layer TL comprising a visual effect contributed by the composite structure CL and/or a visual effect contributed by light from the light source LS. The visual effect contributed by the composite structure may comprise a visual effect without light from the light source and/or a visual effect with light from the light source transmitted through the composite structure. The base layer BL of the composite structure CS of the display system DS for the component C may be configured to provide a visual effect comprising a light dispersion effect; the light dispersion effect may comprise reflection and/or refraction of light at the set of elements shown as projections PR. The composite visual effect of the composite structure may comprise a visual effect of the form/elements of the base layer BL and/or the form/visual object/pattern of the intermediate layer NL and/or the form/ visual object/pattern of the cover layer TL.

According to an exemplary embodiment as shown schematically in FIGS. 3A-3B, 4A-4B, 6, 10A-10B, 12A-12D, 13, 13A-13C, 14, 15, 16, 23, 23A, 27, 28, 29 and 30, the composite visual effect of the composite structure CS of the display system DS for the component C may comprise a combined visual effect of (a) a light scattering/dispersion/ transmission effect (e.g. reflection/refraction, absorption, transmission, etc.) and/or (b) a prismatic effect from the base layer and/or (c) a projection effect from the intermediate layer and/or (d) a decorative effect from the intermediate layer and/or (e) a color effect from the intermediate layer and/or (f) a pattern effect from the intermediate layer and/or (g) a surface effect from the cover layer and/or (h) a depth effect from the cover layer and/or (i) a color effect from the cover layer and/or (j) a pattern effect from the cover layer and/or (k) a lighting effect from the light source and/or (l) a lighting effect from transmission of light from the light source through the base layer and/or (m) a lighting effect from transmission of light from the light source through the base layer and from the intermediate layer and/or (n) a day effect and/or (o) a night effect and/or (p) a stereoscopic effect and/or (q) a deadfront effect and/or (r) static visual effect from the light source and/or (s) dynamic visual effect from the light source and/or (t) and on/off backlit effect to illuminate and/or substantially conceal the interior of/pattern within the composite structure and/or (u) a variation of the viewing angle for a pattern/image within the composite structure and/or (v) a reflection at the surface of the cover layer of the composite structure.

TABLE A

REFERENCE SYMBOL LIST

| ELEMENT, PART OR COMPONENT | REFERENCE SYMBOL |
|---|---|
| Vehicle | V |
| Interior | I |
| Instrument panel (dashboard) | IP |
| Door panel | DP |
| Floor console | FC |
| Overhead console | OHC |
| Component/vehicle interior trim | C/10 |
| Display system | DS |
| Base/housing | B |
| Light/control module | LM |
| Light source/light-emitting unit | LS/1 |
| Lamp/Light-emitting diode (LED) | LED |
| Base layer/lens layer | BL/2 |
| incident surface | 21 |
| emergent surface | 22 |
| prismatic structures | PR/20 |
| acute angle | 201 |
| Intermediate layer/imaging layer | NL/3 |
| Visual object/pattern (effect, decorative, texture, color, etc.) | PT |
| Cover layer | TL/4 |
| Visual object/pattern (e.g. effect, decorative, protective, texture, color etc.) | PX |
| Light guide (light-homogenizing layer/diffuser) | LG/5 |
| Adhesive (optically clear adhesive) | OCA |
| R-value (prismatic structure) | R |
| Image/visual effect | IM |

TABLE B

REFERENCE SYMBOL LIST (LIGHT)

| LIGHT TYPE | REFERENCE SYMBOL |
|---|---|
| Light | L |
| Ambient Light | LA |
| Reflected Light | LF |

TABLE B-continued

REFERENCE SYMBOL LIST (LIGHT)

| LIGHT TYPE | REFERENCE SYMBOL |
|---|---|
| Applied Light (input light-applied from source) | LP |
| Dispersed Light (output light-reflected/refracted, transmitted, absorbed, etc.) | LD |
| Light (directed on line/at point) | Lx/Lz |
| Light (at prism)-red component | LR |
| Light (at prism)-yellow component | LY |
| Light (at prism)-green component | LN |
| Light (at prism)-blue component | LB |
| Light (at prism)-violet component | LV |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior comprising:
a light source configured to provide light;
a composite structure comprising a base layer and an intermediate layer and a cover layer;
wherein the light source is configured to transmit light into the composite structure;
wherein the base layer comprises a surface comprising a set of elements;
wherein the composite structure is configured to present a composite visual effect at the cover layer;
wherein the composite visual effect comprises (a) a visual effect contributed by the composite structure and/or (b) a visual effect contributed by light from the light source;
wherein the visual effect contributed by the composite structure comprises (a) a visual effect without light from the light source and/or (b) a visual effect with light from the light source transmitted through the composite structure;
wherein the set of elements of the surface of the base layer is configured to provide dispersion of light transmitted from the light source;
wherein the base layer is configured to transmit light from the light source into the intermediate layer.

2. The component of claim 1 wherein the light source is configured to provide a lighting effect visible at the cover layer; wherein the lighting effect comprises light visible at the cover layer and/or variation in a form of light transmission and/or variation of light across the composite structure and/or variation of color of light across the composite structure and/or variation of intensity of light across the composite structure and/or variation of pattern of light across the composite structure; and/or motion of light across the composite structure and/or flowing of light across the composite structure and/or sequencing of light across the composite structure and/or intermittence of light across the composite structure.

3. The component of claim 2 wherein the lighting effect comprises at least one of intensity and/or color and/or pattern and/or imagery and/or variation of intensity and/or variation of color and/or variation of pattern and/or variation of imagery.

4. The component of claim 1 wherein the light source is configured to transmit light in a form configured to provide a dynamic visual effect; wherein the form comprises at least one of color and/or amplitude and/or intensity and/or frequency and/or segmentation and/or sequence and/or pattern and or imagery; wherein the form comprises a lighting effect.

5. The component of claim 1 further comprising a diffuser layer (a) between the light source and the base layer and/or (b) between the base layer and the intermediate layer.

6. The component of claim 1 wherein the base layer comprises a lens layer and/or a prismatic surface.

7. The component of claim 1 wherein the set of elements of the surface of the base layer comprises a set of projections comprising at least one of (a) polygonal structures and/or (b) triangular structures and/or (c) quadrangular structures and/or (d) a combination of polygonal structures.

8. The component of claim 1 wherein the set of elements of the surface of the base layer comprises a set of prismatic structures comprising at least one of (a) polygonal prismatic structures and/or (b) triangular prismatic structures and/or (c) quadrangular prismatic structures and/or (d) structures forming an uneven regular surface and/or (e) structures forming an irregular surface and/or (f) structures forming a prismatic surface and/or (g) structures configured to converge light from the light source and/or (h) structures configured to diverge light from the light source and/or (i) structures configured to disperse light from the light source.

9. The component of claim 1 wherein the base layer is configured to provide a visual effect comprising a light dispersion effect; wherein the light dispersion effect comprises reflection and/or refraction of light.

10. The component of claim 1 wherein the base layer is configured to provide a visual effect comprising a prismatic effect; wherein the prismatic effect is provided by the set of elements of the surface of the base layer.

11. The component of claim 1 wherein the intermediate layer is configured to transmit light from the base layer; wherein the intermediate layer comprises a light-transmissive material; wherein the intermediate layer is configured to provide projection of light transmitted from the base layer; wherein the intermediate layer is configured to transmit light from the base layer into the cover layer.

12. The component of claim 1 wherein the intermediate layer is configured to provide an imaging layer; wherein the imaging layer is configured to present a projection of light; wherein the imaging layer comprises a coating and/or a film; wherein the imaging layer comprises at least one of a color and/or a pattern and/or a texture and/or imagery.

13. The component of claim 1 wherein the intermediate layer comprises a decorative layer; wherein the decorative layer is visible through the cover layer; wherein the decorative layer is configured to provide a visual effect comprising at least one of (a) a projection effect (b) a decorative effect and/or (c) a color effect and/or (d) a pattern effect and/or (e) a light dispersion effect and/or (f) a light dispersion effect from the base layer and/or (g) a prismatic effect from the base layer and/or (h) a lighting effect from the light source and/or (i) a lighting effect from transmission of light from the light source through the base layer.

14. The component of claim 1 wherein the cover layer comprises a surface for the composite structure; wherein the cover layer comprises a light-transmissive material; wherein the cover layer comprises at least one of a color and/or a pattern and/or texture and/or a shape and/or a thickness.

15. The component of claim 1 wherein the composite visual effect comprises a combined visual effect of (a) a light dispersion effect and/or (b) a prismatic effect from the base layer and/or (c) a projection effect from the intermediate layer and/or (d) a decorative effect from the intermediate layer and/or (e) a color effect from the intermediate layer and/or (f) a pattern effect from the intermediate layer and/or (g) a surface effect from the cover layer and/or (h) a depth effect from the cover layer and/or (i) a color effect from the cover layer and/or (j) a pattern effect from the cover layer and/or (k) a lighting effect from the light source and/or (l) a lighting effect from transmission of light from the light source through the base layer and/or (m) a lighting effect from transmission of light from the light source through the base layer and from the intermediate layer and/or (n) a day effect and/or (o) a night effect and/or (p) a stereoscopic effect and/or (q) a deadfront effect and/or (r) static visual effect from the light source and/or (s) dynamic visual effect from the light source and/or (t) and on/off backlit effect to illuminate and/or substantially conceal the interior of/pattern within the composite structure and/or (u) a variation of the viewing angle for a pattern/image within the composite structure and/or (v) a reflection at the surface of the cover layer of the composite structure.

16. A component for a vehicle interior comprising:
a light-emitting unit;
a lens layer comprising an incident surface and/or an emergent surface configured as a curved surface and/or a prismatic surface;
an imaging layer configured to receive light emitted by the light-emitting unit and projected on the imaging layer through the lens layer to form a projection; and
a cover layer;
wherein the projection on the imaging layer is rendered visible through the cover layer;
wherein the lens layer comprises the prismatic surface comprising prismatic elements;
wherein the cover layer and/or the imaging layer are configured to provide a pattern.

17. The component of claim 16 wherein the lens layer comprises the prismatic surface comprising prismatic elements at an acute angle; wherein the prismatic elements are configured with an R value between 0.01-0.09 mm.

18. The component of claim 16 wherein the light-emitting unit is configured to provide a dynamic effect comprising a segmented light effect and/or an active light effect and/or and an intermittent light-dark effect.

19. The component of claim 16 wherein the cover layer and/or the imaging layer are configured to provide at least one of the pattern and/or a texture and/or a color.

20. A component for a vehicle interior comprising:
a light source configured to provide light;
a composite structure comprising a base layer and an intermediate layer and a cover layer;
wherein the light source is configured to transmit light into the composite structure;
wherein the base layer comprises a surface comprising a set of elements;
wherein the composite structure is configured to present a composite visual effect at the cover layer;
wherein the intermediate layer is configured to transmit light from the base layer;
wherein the intermediate layer comprises a light-transmissive material;
wherein the intermediate layer is configured to provide projection of light transmitted from the base layer;
wherein the intermediate layer is configured to transmit light from the base layer into the cover layer;
wherein the intermediate layer comprises a decorative layer;
wherein the decorative layer is visible through the cover layer;
wherein the decorative layer is configured to provide a visual effect comprising at least one of (a) a projection effect (b) a decorative effect and/or (c) a color effect and/or (d) a pattern effect and/or (e) a light dispersion effect and/or (f) a light dispersion effect from the base layer and/or (g) a prismatic effect from the base layer and/or (h) a lighting effect from the light source and/or (i) a lighting effect from transmission of light from the light source through the base layer.

21. The component of claim 20 wherein the visual effect contributed by the composite structure comprises (a) a visual effect without light from the light source and (b) a visual effect with light from the light source transmitted through the composite structure.

* * * * *